United States Patent
Jun et al.

(10) Patent No.: US 10,349,798 B2
(45) Date of Patent: Jul. 16, 2019

(54) MOBILE ROBOT AND METHOD OF CONTROLLING THE SAME

(71) Applicant: LG ELECTRONICS INC., Seoul (KR)

(72) Inventors: Woochan Jun, Seoul (KR); Chulmo Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 15/597,531

(22) Filed: May 17, 2017

(65) Prior Publication Data

US 2017/0332862 A1  Nov. 23, 2017

(30) Foreign Application Priority Data

May 17, 2016 (KR) ................. 10-2016-0060444
Oct. 27, 2016 (KR) ................. 10-2016-0141106

(51) Int. Cl.
*A47L 11/40* (2006.01)
*A47L 5/22* (2006.01)
(Continued)

(52) U.S. Cl.
CPC ............. *A47L 11/4061* (2013.01); *A47L 5/22* (2013.01); *A47L 9/2826* (2013.01);
(Continued)

(58) Field of Classification Search
CPC ......... A47L 11/4061; A47L 5/22; B25J 5/007; G01C 21/206
See application file for complete search history.

(56) References Cited

U.S. PATENT DOCUMENTS 4,954,962 A  9/1990 Evans, Jr. et al.
6,496,754 B2  12/2002 Song et al.
(Continued)

FOREIGN PATENT DOCUMENTS

CN  103941735  7/2014
CN  203943625  11/2014
(Continued)

OTHER PUBLICATIONS

PCT International Search Report (with English Translation) dated Feb. 20, 2018 issued in Application No. PCT / KR2017 / 005133.
(Continued)

*Primary Examiner* — Basil T. Jos
(74) *Attorney, Agent, or Firm* — Ked & Associates, LLP

(57) ABSTRACT

A mobile robot of the present disclosure includes a first pattern emission unit configured to emit a first patterned light downward and forward from the main body on a floor of an area to be cleaned; and an image acquisition unit configured to acquire an image of first patterned light emitted by the first pattern emission unit and is incident on an obstacle, so as to determine an obstacle based on a pattern detected from the acquired image. Accordingly, based on the information on the nearby obstacles, by determining whether the mobile robot is in a stuck state where traveling of the mobile robot is limited by a plurality of obstacles, and by setting up an escape for traveling, traveling state of the mobile robot and obstacles may be determined rapidly and a corresponding operation may be performed, thereby enabling effective traveling to escape from the stuck state.

19 Claims, 27 Drawing Sheets

(51) Int. Cl.
*B25J 5/00* (2006.01)
*G01C 21/20* (2006.01)
*A47L 11/33* (2006.01)
*A47L 9/28* (2006.01)
*A47L 9/30* (2006.01)
*G05D 1/02* (2006.01)
*G01S 17/00* (2006.01)
*A47L 9/00* (2006.01)
*A47L 11/00* (2006.01)

(52) U.S. Cl.
CPC ........... *A47L 9/2852* (2013.01); *A47L 9/2873* (2013.01); *A47L 9/2884* (2013.01); *A47L 9/30* (2013.01); *A47L 11/33* (2013.01); *A47L 11/4066* (2013.01); *A47L 11/4069* (2013.01); *B25J 5/007* (2013.01); *G01C 21/206* (2013.01); *G01S 17/00* (2013.01); *G05D 1/024* (2013.01); *G05D 1/0231* (2013.01); *G05D 1/0246* (2013.01); *G05D 1/0248* (2013.01); *G05D 1/0274* (2013.01); *A47L 9/00* (2013.01); *A47L 11/00* (2013.01); *A47L 2201/022* (2013.01); *A47L 2201/04* (2013.01); *A47L 2201/06* (2013.01); *G05D 2201/0215* (2013.01); *Y10S 901/01* (2013.01)

(56) References Cited

U.S. PATENT DOCUMENTS

| | | | |
|---|---|---|---|
| 8,693,007 | B2 | 4/2014 | Ishigaki |
| 8,781,626 | B2 | 7/2014 | Landry et al. |
| 8,862,271 | B2 | 10/2014 | Shamlian et al. |
| 9,339,163 | B2 | 5/2016 | Noh et al. |
| 9,440,355 | B2 | 9/2016 | Noh et al. |
| 9,511,494 | B2 | 12/2016 | Noh et al. |
| 9,981,593 | B2 | 5/2018 | Mayer |
| 2005/0000543 | A1* | 1/2005 | Taylor ............... G05D 1/0219 134/18 |
| 2010/0110280 | A1 | 5/2010 | Aoyama |
| 2010/0257690 | A1 | 10/2010 | Jones et al. |
| 2011/0144805 | A1 | 6/2011 | Chiappetta et al. |
| 2014/0209122 | A1 | 7/2014 | Jung et al. |
| 2014/0304937 | A1 | 10/2014 | Kim et al. |
| 2015/0120056 | A1 | 4/2015 | Noh et al. |
| 2015/0168954 | A1 | 6/2015 | Hickerson et al. |
| 2015/0363914 | A1 | 12/2015 | Boyle et al. |
| 2016/0104044 | A1 | 4/2016 | Noh et al. |
| 2016/0279808 | A1 | 9/2016 | Doughty et al. |
| 2017/0072558 | A1 | 3/2017 | Reynolds et al. |
| 2017/0154219 | A1 | 6/2017 | Shin et al. |

FOREIGN PATENT DOCUMENTS

| | | |
|---|---|---|
| CN | 104245244 | 12/2014 |
| CN | 104586322 | 5/2015 |
| CN | 104597902 | 5/2015 |
| CN | 205031182 | 2/2016 |
| JP | 2013-104858 | 5/2013 |
| JP | 2014-048842 | 3/2014 |
| KR | 10-2013-0141979 | 12/2013 |
| KR | 10-1362373 | 2/2014 |
| KR | 10-2015-0050160 | 5/2015 |
| KR | 10-2015-0065972 | 6/2015 |
| KR | 10-2016-0043841 | 4/2016 |

OTHER PUBLICATIONS

PCT International Search Report (with English Translation) dated Feb. 26, 2018 issued in Application No. PCT / KR2017 / 005135.
Taiwanese Office Action dated Feb. 26, 2018 issued in Application No. 106116156.
Korean Office Action dated Mar. 20, 2018 issued in Application No. 10-2016-0141106.
Taiwanese Office Action dated Mar. 29, 2018 issued in Application No. 106116154.
PCT International Search Report (with English Translation) dated Sep. 4, 2017 issued in Application No. PCT / KR2017 / 005136.
Taiwanese Office Action dated Feb. 5, 2018 issued in Application No. 106116151.
PCT International Search Report (with English Translation) dated Feb. 26, 2018 issued in Application No. PCT / KR2017 / 005132.
Taiwanese Office Action dated Mar. 14, 2018 issued in Application No. 106116158.
United States Office Action dated Feb. 1, 2019 issued in co-pending related U.S. Appl. No. 15/597,333.
U.S. Appl. No. 15/597,333, filed May 17, 2017.
U.S. Appl. No. 15/597,418, filed May 17, 2017.
U.S. Appl. No. 15/597,670, filed May 17, 2017.
U.S. Office Action dated Feb. 26, 2019 issued in U.S. Appl. No. 15/597,418.

* cited by examiner (a)

(b)

(c)

(d)

(e)

(a)  (b)

(a)  (b)

(b)

(a)

(b)

(a)

MOBILE ROBOT AND METHOD OF CONTROLLING THE SAME

CROSS-REFERENCE TO RELATED APPLICATION(S)

This application claims the priority benefit of Korean Patent Application No. 10-2016-0060444, filed on May 17, 2016 and Korean Patent Application No. 10-2016-0141106, filed on Oct. 27, 2016 in the Korean Intellectual Property Office, the disclosures of which are incorporated herein by reference.

BACKGROUND

1. Field

The present disclosure relates to a mobile robot and a method of controlling the same, in which the mobile robot may detect and bypass obstacles.

2. Background

A mobile robot is a home appliance that performs cleaning by sucking dust or foreign substances from a floor while travelling autonomously in an area to be cleaned without a user's operation. The mobile robot detects the distance to obstacles, such as furniture, office supplies, walls, and the like, which are installed in an area to be cleaned, and based on the detection, the mobile robot performs mapping of the area to be cleaned, or bypasses the obstacles by controlling driving of left and right wheels included in the mobile robot.

In the existing technology, a travelling distance of the mobile robot may be measured by a sensor which faces the ceiling or floor, and the distance to an obstacle is calculated based on the measurement. However, indirectly measuring the distance to an obstacle based on an estimated moving distance of the mobile robot results in inaccuracy since the moving distance of the mobile robot may not be measured accurately due to an uneven surface of the floor and the like. Furthermore, the mobile robot may emit infrared or ultrasound toward a receiving surface and measure the reflections to measure distances, but this method may result in a significant error in the measurement of distance due to a huge amount of light or sound diffused by the receiving surface.

Korean Laid-open Patent Publication No. 10-2013-0141979 (hereinafter referred to as the '979 disclosure) discloses a mobile robot, which includes a light emitting unit emitting light in a cross pattern, and a camera unit acquiring a forward image of a cleaner. However, the mobile robot of the '979 disclosure has a drawback in that the mobile robot has one light source configured to emit light at a uniform angle, thereby limiting the range of detection of obstacles and leading to difficulty in identifying stereoscopic shapes of high obstacles.

Further, when the existing mobile robot enters an area which is small and surrounded by many obstacles, the mobile robot may be confined by obstacles, which limits movement of the mobile robot. Particularly, when there many surrounding obstacles, the mobile robot is required to repeatedly detect and bypass the obstacles, such that the battery may be discharged in the repeated attempt to bypass the obstacles. In order to prevent state in which the mobile robot is stuck between multiple obstacles, the mobile robot may be programmed to avoid an area associated with the obstacles. However, avoiding entire regions with obstacles narrows a range of the area to be cleaned.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1A:
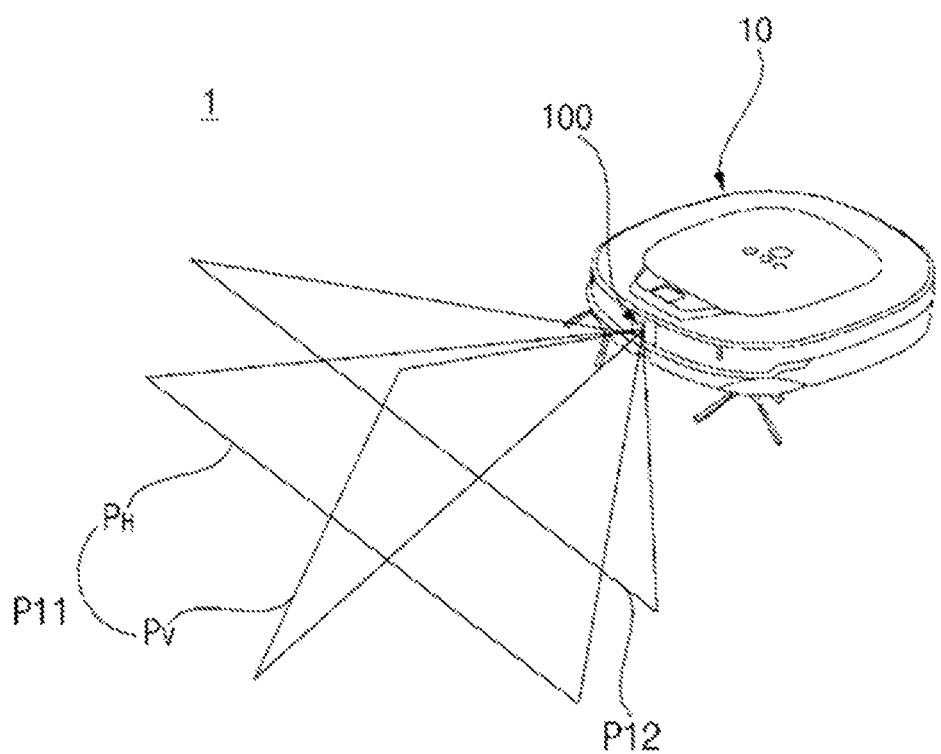
FIG. 1A is a perspective view of a mobile robot according to an exemplary embodiment of the present disclosure.

Referring to FIGS. 1 to 4, the mobile robot 1 according to an exemplary embodiment of the present disclosure includes: a main body 10, which travels over the floor of an area to be cleaned to suck dust or foreign substances from the floor; and an obstacle detection unit 100 provided on a front surface of the main body 10.

The main body 10 includes: a casing 11, which forms an exterior of the main body 10 and a space to accommodate components of the main body 10; a suction unit 34 provided at the casing 11 to suck dust, waste, and the like; and a left wheel 36 (L) and a right wheel 36 (R) which are rotatably provided at the casing 11. As the left wheel 36 (L) and the right wheel 36 (R) rotate, the main body 10 travels in the floor of the area to be cleaned, so that the suction unit may suck foreign materials.

The suction unit includes a rotating brush or roller 34, a suction fan (not shown) to generate a suction force, a suction hole 10h, through which air generated by rotation of the suction fan is suctioned. The suction unit 34 may also include a filter to collect foreign materials from the air suctioned through the suction hole 10h and a foreign substance collecting container (not shown) where the foreign substances collected from the filter are stored.

Further, the main body 10 may include a travel driving unit 300 to drive the left wheel 36 (L) and the right wheel 36 (R). The travel driving unit 300 may include at least one driving motor. The driving motor may include a left wheel driving motor, which rotates the left wheel 36 (L), and the right wheel driving motor, which rotates the right wheel 36 (R).

The left wheel driving motor and the right wheel driving motor are controlled independently from each other by the travel control unit 230 of the controller 200, such that the main body 10 may move forward or backward, or may turn. For example, in the case where the main body 10 moves forward, the left wheel driving motor and the right wheel driving motor may rotate in the same direction; however, when the left wheel driving motor and the right wheel driving motor may rotate at different speeds or rotate in opposite directions to each other, a traveling direction of the main body 10 may be changed. At least one auxiliary wheel 37 may be further included in the main body 10 to stably support the main body 10.

The main body 10 may be further provided with a plurality of brushes or blades 35, which are positioned at a front bottom portion of the casing 11, and have radially extending bristles with a plurality of wings. As the plurality of brushes 35 rotate, dust may be removed from the floor of the area to be cleaned, and the removed dust is suctioned through the suction hole 10h into the collecting container. Additionally, a control panel 39 may be provided, which is provided on the top of the casing 11, and receives, from a user, input of various instructions to control the mobile robot 1.

Figure 1B:
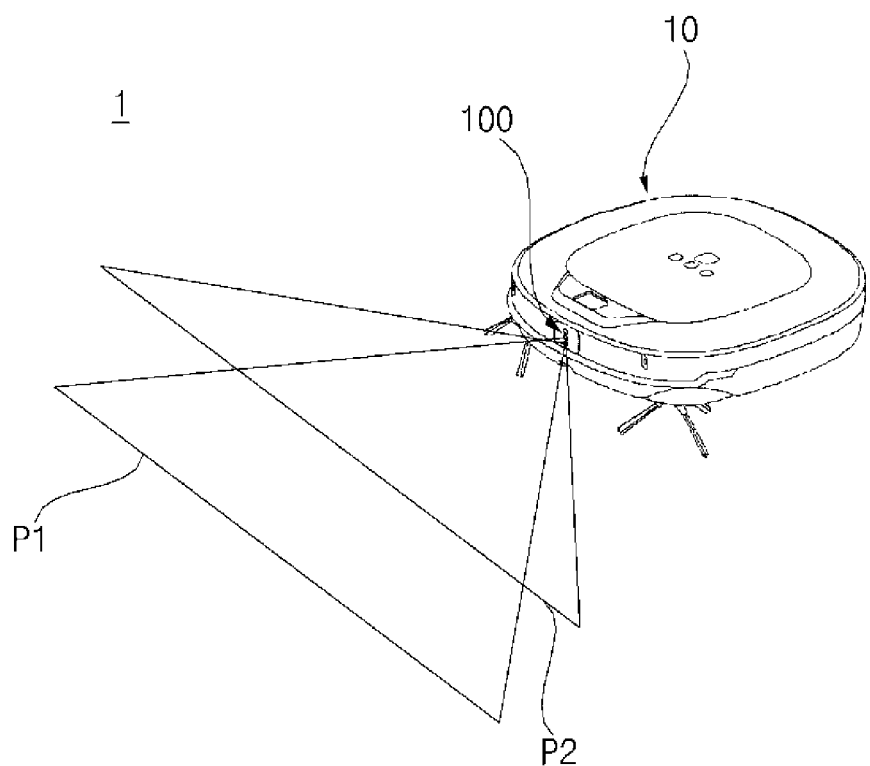
FIG. 1B is a perspective view of a mobile robot according to another exemplary embodiment of the present disclosure.

The obstacle detection unit 100 may be provided on a front surface of the main body 10. For example, the obstacle detection unit 100 may be fixed at a front surface of the casing 11, and may include a first pattern emission unit (or light source) 120, a second pattern emission unit (or light source) 130, and the image acquisition unit (or camera) 140. Patterned light emitted by the first pattern emission unit 120 and patterned light emitted by the second pattern emission unit 130 may be in different patterns as illustrated in FIGS. 1A and 1B. The first pattern emission unit 120 and the second pattern emission unit 130 illustrated in FIGS. 1A and 1B are indicated by the same reference numerals, and the shape of the emitted pattern is not limited to the drawings.

As illustrated in FIG. 1A, the first pattern emission unit 120 emits light in a first pattern P1 (hereinafter referred to as first patterned light) downward and forward from the main body 10. The second pattern emission unit 120 emits light in a second pattern P2 (hereinafter referred to as second patterned light) upward and forward from the main body 10. In the case where the first patterned light P1 and the second patterned light P2 are emitted onto the floor or an obstacle, the first patterned light P1 and the second patterned light P2 each are in a straight-line shape in a horizontal direction.

As illustrated in FIG. 1B, the first pattern emission unit 120 may emit light in an alternative first pattern P11 (hereinafter referred to as alternative first patterned light) downward and forward from the main body 10. Accordingly, the alternative first patterned light P11 may be emitted to the floor of an area to be cleaned. The alternative first patterned light P11 may be in a cross shape formed by intersecting a horizontal line Ph and a vertical line Pv. The second pattern emission unit 120 emits light in an alternative second pattern P12 (hereinafter referred to as alternative second patterned light) upward and forward from the main body 10. The alternative second patterned light P12 is in a straight-line shape in a horizontal direction parallel to the horizontal line Ph of the alternative first patterned light.

Figure 3A:
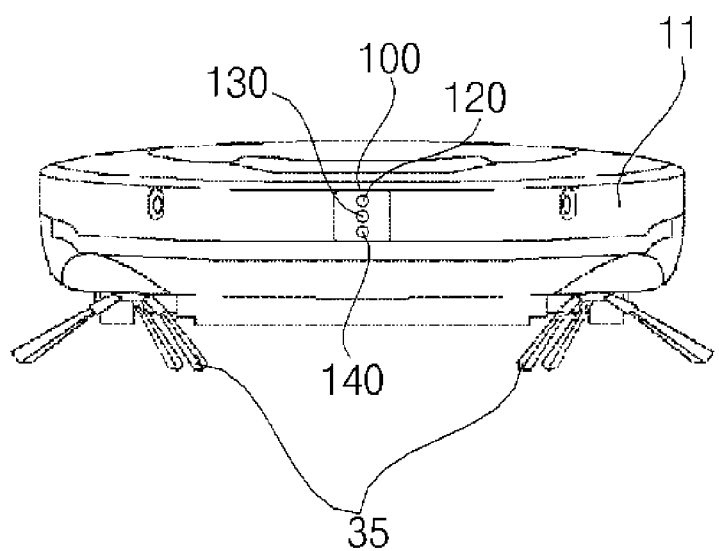
FIG. 3A is a front view of the mobile robot illustrated in FIG. 1A.
Figure 3B:
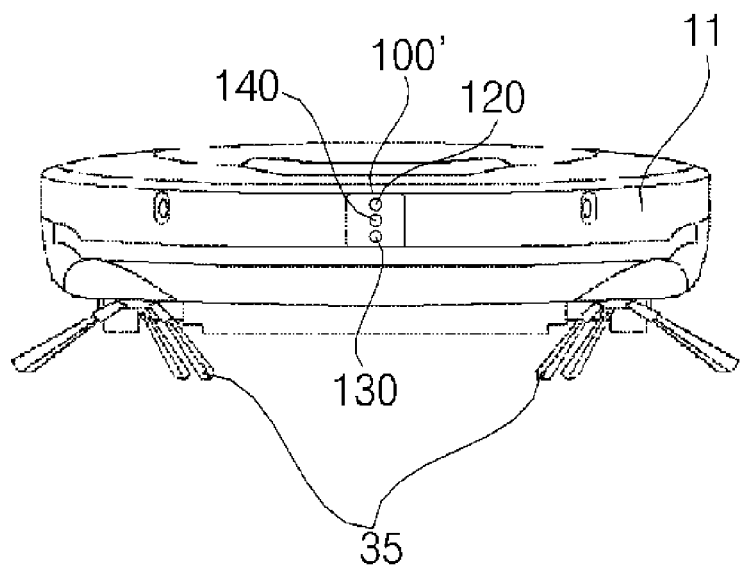
FIG. 3B is a front view of the mobile robot illustrated in FIG. 1B.
Figure 4:
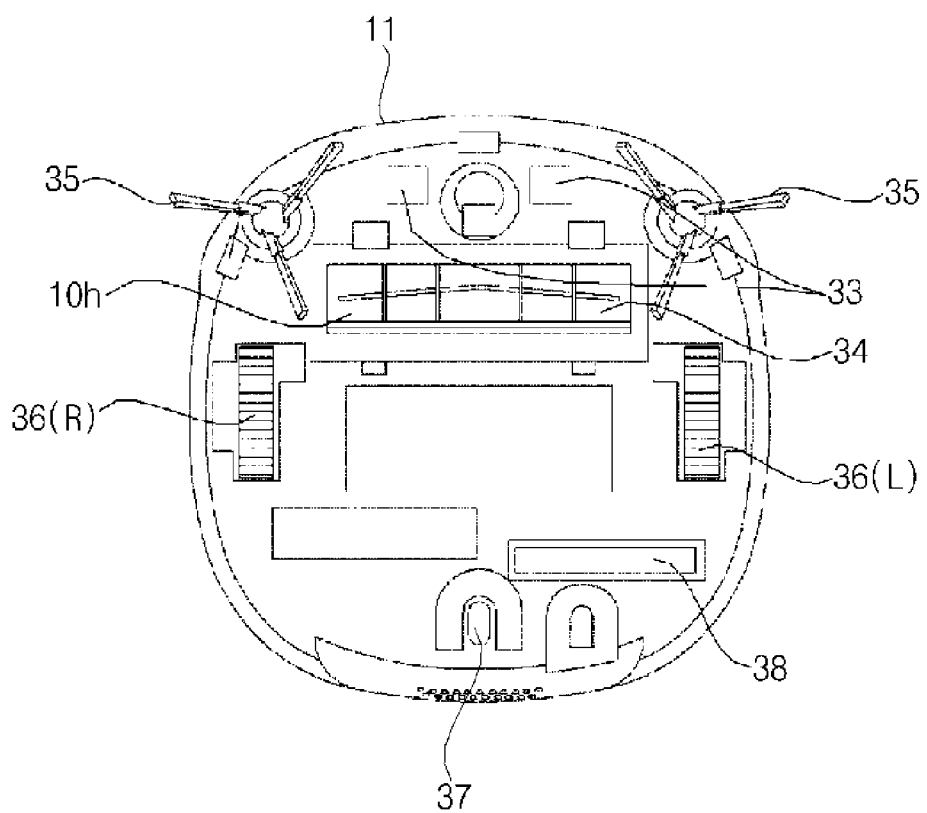
FIG. 4 is a bottom view of the mobile robot illustrated in FIG. 1.

As illustrated in FIG. 3A, the obstacle detection unit 100 according to a first exemplary embodiment includes the image acquisition unit 140 provided in a line below the first pattern emission unit 120 and the second pattern emission unit 130. Further, as illustrated in FIG. 3B, the obstacle detection unit 100' according to a second exemplary embodiment includes the image acquisition unit 140 provided in a line between the first pattern emission unit 120 and the second pattern emission unit 130. The image acquisition unit 140 may be provided at the center therebetween, i.e., the distance from the image acquisition unit 140 to the first pattern emission unit may be identical to the distance from the image acquisition unit 140 to the second pattern emission unit 130. In the obstacle detection unit according to the first and second exemplary embodiments, the shape of patterns emitted by the first pattern emission unit 120 and the second pattern emission unit 130 may be any shape, either the straight-line shape illustrated in FIG. 1A or the cross shape illustrated in FIG. 1B.

The main body 10 may be equipped with a rechargeable battery 38, which is charged by connecting a charging terminal 33 to a commercial power source (for example, power outlet at home), or by docking the main body 10 at a charging station connected to the commercial power source such that the charging terminal may be electrically connected to the commercial power source. Electronic parts included in the mobile robot 1 may be supplied with power from the battery 38. Thus, upon charging the battery 38, the mobile robot 1 may travel autonomously after electrically separating from the commercial power source.

Figure 5:
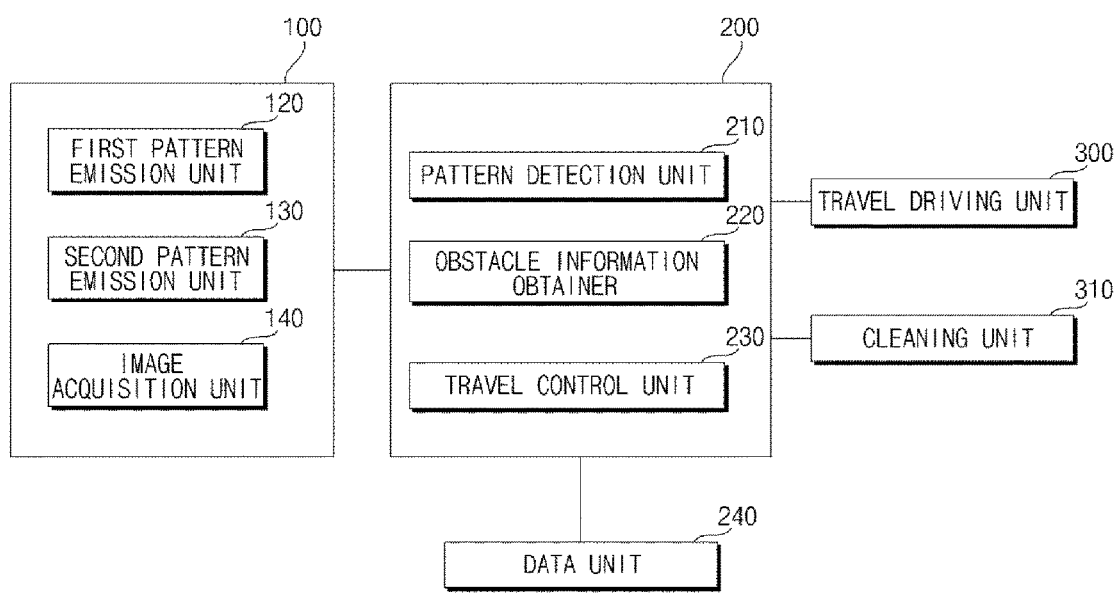
FIG. 5 is a block diagram illustrating main parts of the mobile robot illustrated in FIG. 1.

FIG. 5 is a block diagram illustrating main parts of the mobile robot illustrated in FIG. 1. The mobile robot 1 includes a travel driving unit 300, a cleaning unit 310, a data unit 240, an obstacle detection unit 100, and a controller 200 which controls the overall operation of the mobile robot 1. The controller 200 may be implemented as one or more processors, or may be implemented as a hardware device.

The controller 200 may include a travel control unit 230 which controls the travel driving unit 300. The left wheel driving motor and the right wheel driving motor are controlled independently from each other by the travel control unit 230, such that the main body 10 may move forward or rotate. Further, the controller 200 includes a pattern detection unit 210 which detects a pattern by analyzing data input from the obstacle detection unit 100; and an obstacle information obtainer 220 which determines an obstacle based on a pattern.

The pattern detection unit 210 detects optical patterns P1 and P2 from an image acquired by the image acquisition unit 140. Hereinafter, description of the optical pattern will be made by using the first patterned light P1 and the second patterned light P2 illustrated in FIG. 1A, but the description may also be applied to the optical pattern of the alternative first patterned light and the alternative second patterned light illustrated in FIG. 1B.

The pattern detection unit 210 may detect features, such as dots, lines, sides, and the like, of pixels forming the acquired image, and based on the detected features, the pattern detection unit 210 may detect optical patterns P1 and P2, or dots, lines, sides, and the like, of the optical patterns P1 and P2. The obstacle information obtainer 220 determines the presence of an obstacle based on the pattern detected by the pattern detection unit 210, and determines the shape of an obstacle.

The travel driving unit 300 includes at least one driving motor to enable the mobile robot 1 to travel according to a control command of the travel control unit 230. As described above, the travel driving unit 300 may include the left wheel driving motor, which rotates the left wheel 36 (L), and the right wheel driving motor, which rotates the right wheel 36 (R). The cleaning unit (or controller) 310 operates the cleaning brush 34 and/or the brushes 35 to facilitate suctioning of dust or foreign substances around the robot cleaner 1, and operates the suction device to suck dust or foreign substances. The cleaning unit 310 controls the suction fan included in the suction unit 34 that suctions foreign materials such as dust or waste, so that dust may be drawn into the foreign material collecting container through the suction hole.

The data unit 240 stores the acquired image input from the obstacle detection unit 100; reference data used for the obstacle information obtainer 220 to determine an obstacle; and obstacle information on the detected obstacle. Further, the data unit 240 may store control data to control the operation of the mobile robot 1; data according to a cleaning mode of the mobile robot 1; and a map generated or received from an external source. In addition, the data unit 240 may store data readable by a microprocessor, and may include Hard Disk Drive (HDD), Solid State Disk (SSD), Silicon Disk Drive (SDD), Read-Only Memory (ROM), Random-Access Memory (RAM), Compact Disk Read Only Memory (CD-ROM), a magnetic tape, a floppy disk, an optical data storage device, etc.

The obstacle detection unit 100 includes the first pattern emission unit 120, the second pattern emission unit 130, and the image acquisition unit 140. As described above, in the obstacle detection unit 100, the first pattern emission unit 120, the second pattern emission unit 130, and the image acquisition unit 140 are provided at a front portion of the main body 10 to emit the first patterned light P1 and the second patterned light P2 forward from the mobile robot 1, and captures and acquires an image of the emitted patterned light.

The controller 200 stores the acquired image in the data unit 240, and the pattern detection unit 210 analyzes the acquired image to extract a pattern. That is, the pattern detection unit 210 extracts an optical pattern obtained by emitting patterned light, which is emitted by the first pattern emission unit or the second pattern emission unit, to a floor or an obstacle. The obstacle information obtainer 220 determines an obstacle based on the extracted optical pattern.

The controller 200 determines an obstacle based on the acquired image input from the obstacle detection unit 100, and controls the travel driving unit 300 to change a moving direction or a traveling path to bypass the obstacle while traveling. In the case where an obstacle is a cliff, the mobile robot 1 may fall off the cliff. Accordingly, the controller 200 detects the cliff from the acquired image, and checks again the cliff by using a cliff sensor (not shown) included therein, so as to control the mobile robot 1 not to fall off the cliff. In response to determination that the obstacle is a cliff, the controller 200 determines a change in pattern based on the acquired image, and controls the travel driving unit 300 to travel along the cliff.

Further, in the case where traveling is limited due to a plurality of obstacles present in a space equal to or smaller than a predetermined size, the controller 200 determines whether the mobile robot 1 is in a stuck state, and sets an escape mode so that the mobile robot 1 may escape from the stuck state.

Based on whether the current mode is a default mode or a fast clean mode, the controller 200 sets up an escape path by using information on each nearby obstacle, so that the mobile robot 1 may escape from the stuck state. In the default mode, the controller 200 may set up an escape path by obtaining information on all the nearby obstacles and generating a map of a surrounding area; and in the fast clean mode, the controller 200 may set up an escape path by determining whether it is possible to pass through a space between detected obstacles based on a distance therebetween. The controller 200 analyzes a pattern of an acquired image of a detected obstacle to determine the distance between obstacles; and if the distance between the obstacles is equal to or greater than a predetermined value, the controller 200 determines that it is possible to pass through a space between the obstacles and controls the mobile robot 1 to travel to escape from the stuck state.

Figure 6:
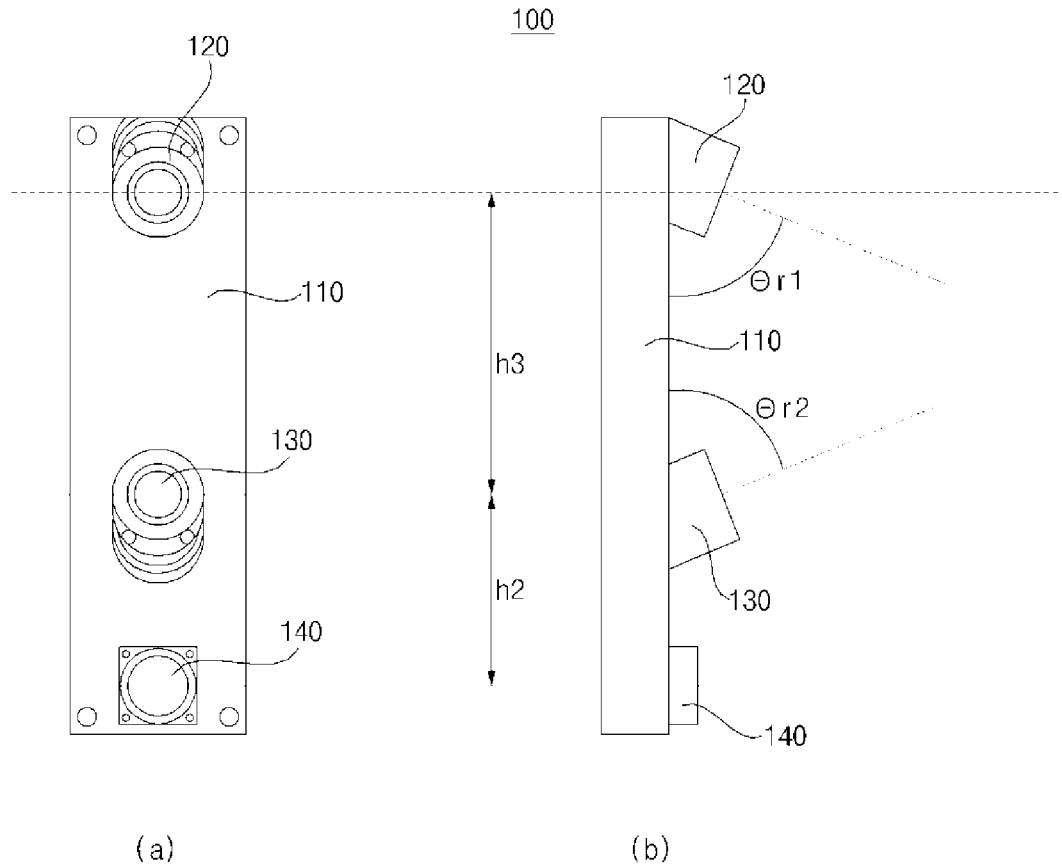
FIG. 6 is a front view and a lateral view of an obstacle detection unit according to a first exemplary embodiment of the present disclosure.
Figure 7:
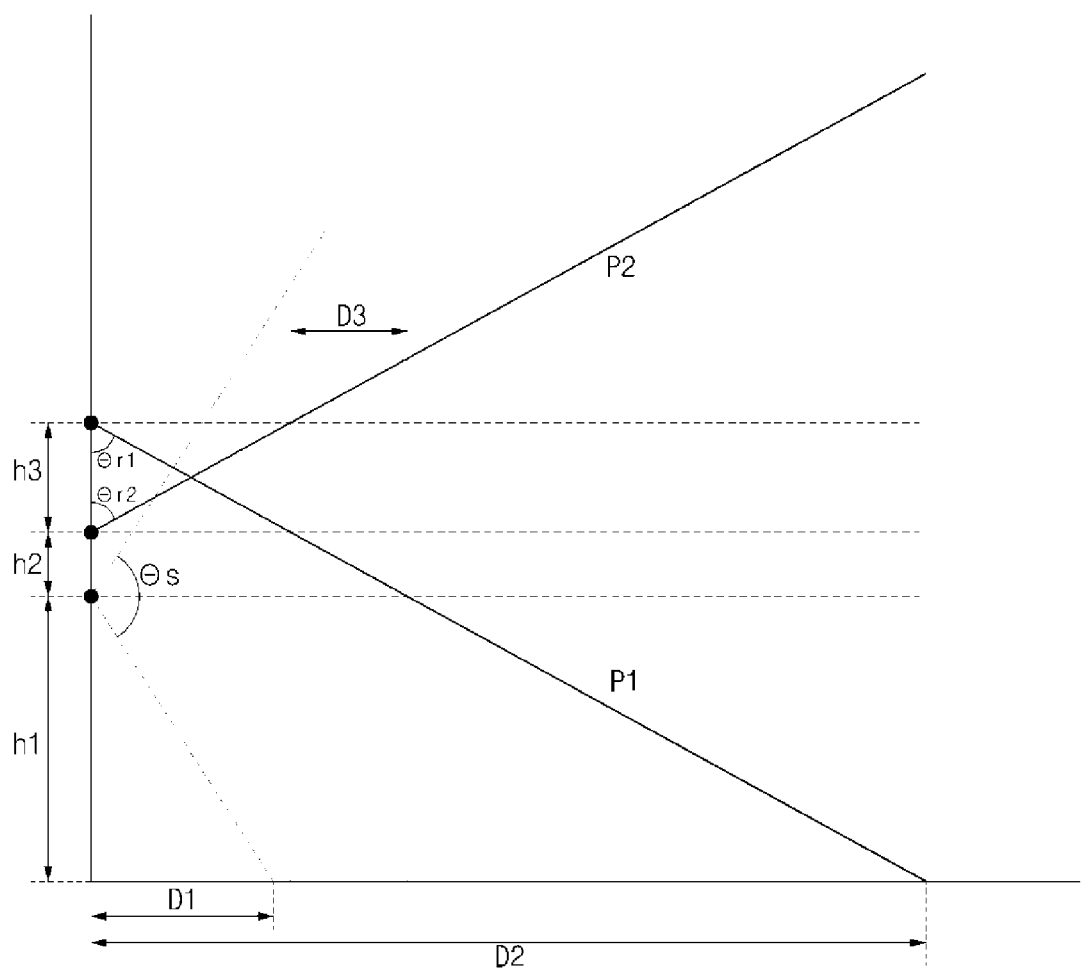
FIG. 7 is a diagram illustrating a pattern emission range and an obstacle detection range of the obstacle detection unit illustrated in FIG. 6.

FIG. 6 is a front view and a lateral view of an obstacle detection unit according to a first exemplary embodiment of the present disclosure; and FIG. 7 is a diagram illustrating a pattern emission range and an obstacle detection range of the obstacle detection unit illustrated in FIG. 6. A front view of the obstacle detection unit is illustrated in portion (a) of FIG. 6, and a lateral view thereof is illustrated in portion (b) of FIG. 6.

As illustrated in portions (a) and (b) of FIG. 6, in the obstacle detection unit 100 according to the first exemplary embodiment, the first pattern emission unit 120 and the second pattern emission unit 130 each include a light source, and an Optical Pattern Projection Element (OPPE) which generates a predetermined pattern by transmitting light emitted from the light source. The light source may be a laser diode (LD), a light emitting diode (LED), and the like. Laser light has excellent monochromaticity, straightness, and connectivity properties, as compared to other light sources, thereby enabling fine distance measurement. Particularly, since infrared light or visible light has a high deviation in precision in distance measurement according to factors, such as colors and materials of a target object, it is desired to use the laser diode as the light source. The OPPE may include a lens or a diffractive optical element (DOE). Depending on the configuration of the OPPE included in the pattern emission unit 120 and the pattern emission unit 130, light in various patterns may be emitted.

The first pattern emission unit 120 may emit the first patterned light P1 downward and forward from the main body 10. Accordingly, the first patterned light P1 may be emitted to the floor of an area to be cleaned. The first patterned light P1 may be in a horizontal line shape. Further, the first patterned light P1 may also be in a cross shape with a horizontal line intersecting a vertical line.

The first pattern emission unit 120, the second pattern emission unit 130, and the image acquisition unit 140 may be arranged vertically in a line. The image acquisition unit 140 is provided below the first pattern emission unit 120 and the second pattern emission unit 130, but the present disclosure is not limited thereto, and the image acquisition unit 140 may be dispose above the first pattern emission unit 120 and the second pattern emission unit 130.

In the embodiment, the first pattern emission unit 120 is provided on the top and emits the first patterned light P1 downward and forward, so as to detect an obstacle located at a position lower than the first pattern emission unit 120. The second pattern emission unit 130 provided below the first pattern emission unit 120 and emits the second patterned light P2 upward and forward, such that the second patterned light P2 may be emitted onto the wall, or an obstacle located at a position higher than at least the second pattern emission unit 130, or a portion of the obstacle. The second patterned light P2 may be formed to be different from the first patterned light P1, and may be formed to include a horizontal line. Here, the horizontal line is not necessarily a continuous line segment, and may be formed to be a dotted line.

Figure 2:
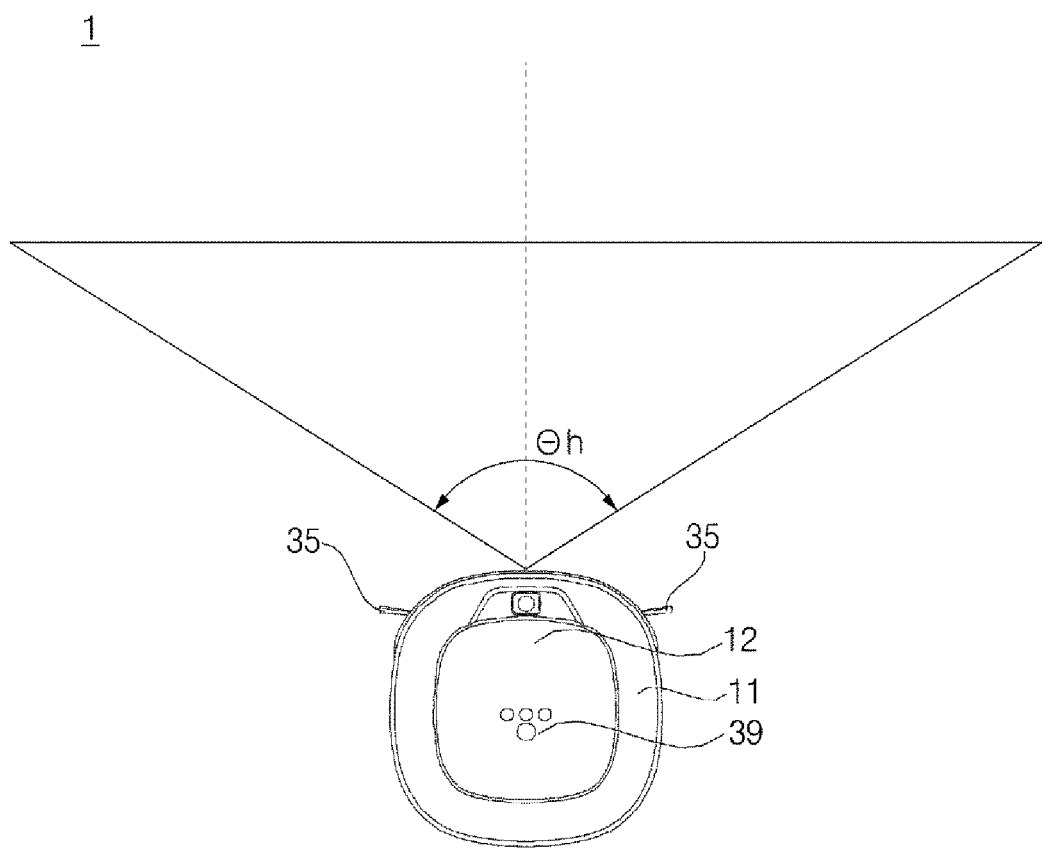
FIG. 2 is a diagram illustrating a horizontal view angle of the mobile robot illustrated in FIG. 1.

As illustrated above in FIG. 2, an emission angle θh is a horizontal emission angle of the first patterned light P1 emitted by the first pattern emission unit 120. The emission angle θh represents an angle formed between both ends of the horizontal line and the first pattern emission unit 120, and is desirably set in a range of 130° to 140°, but is not limited thereto. The dotted line of FIG. 2 represents a direction forward of the mobile robot 1, and the first patterned light P1 may be formed to be symmetrical with respect to the dotted line.

Similarly to the first pattern emission unit 120, a horizontal emission angle of the second pattern emission unit 130 may be desirably set in a range of 130° to 140°, and in some embodiments, the second patterned light P2 may be emitted at the same horizontal emission angle as that of the first pattern emission unit 120. In this case, the second patterned light P2 may also be formed to be symmetrical with respect to the dotted line of FIG. 2.

The image acquisition unit 140 may acquire a forward image of the main body 10. Particularly, the first patterned light P1 and the second patterned light P2 are displayed on the image (hereinafter referred to as an acquired image) acquired by the image acquisition unit 140, in which images of the first patterned light P1 and the second patterned light P2 displayed on the acquired image will be hereinafter referred to as optical patterns; and as the optical patterns are images, projected on the image sensor, of the first patterned light P1 and the second patterned light P2 incident on an actual space, the same reference numerals as the first patterned light P1 and the second patterned light P2 will be given to a first optical pattern P1, which corresponds to the first patterned light P1, and a second optical pattern P2, which corresponds to the second patterned light P2.

The image acquisition unit 140 may include a digital camera, which converts an image of a subject into an electric signal, converts the electric signal into a digital signal, and then stores the digital signal in a memory device. The digital camera includes an image sensor (not shown) and an image processor (not shown). The image sensor is a device that converts an optical image into an electrical signal, and is formed as a chip having a plurality of photodiodes integrated therein. For example, the photodiodes may be pixels. When light, having passed through the lens, forms an image on the chip, charges are accumulated in the respective pixels constructing the image, and the charges accumulated in the pixels are converted into an electrical signal (for example, voltage). As is well known, a Charge Coupled Device (CCD), a Complementary Metal Oxide Semiconductor (CMOS), and the like, may be used as the image sensor.

The image processor generates a digital image based on an analog signal output from the image sensor. The image processor includes: an A/D converter to convert the analog signal into a digital signal; a buffer memory to temporarily store digital data according to the digital signal output from the A/D converter; and a digital signal processor (DSP) to generate a digital image by processing the data stored in the buffer memory.

The pattern detection unit 210 may detect features, such as dots, lines, sides, and the like, of pixels in the acquired image, and based on the detected features, the pattern detection unit 210 may detect optical patterns P1 and P2, or dots, lines, sides, and the like, of the optical patterns P1 and P2. For example, the pattern detection unit 210 may extract line segments formed by consecutive pixels that are brighter than neighboring pixels, so as to extract a horizontal line, which forms the first optical pattern P1, and a horizontal line which forms the second optical pattern P2. However, the pattern extraction method is not limited thereto, and various methods of extracting a desired pattern are already known in the art, which may be used by the pattern detection unit 210 to extract the first optical pattern P1 and the second optical pattern P2. For example, the first and/or second patterned lights p1 and P2 may be emitted at certain wavelengths (or colors), and the pattern detection unit 210 may be configured to identify portions of an image associated with those wavelengths.

As illustrated in FIG. 7, the first pattern emission unit 120 and the second pattern emission unit 130 may be provided symmetrical to each other. The first pattern emission unit 120 and the second pattern emission unit 130 are vertically spaced apart from each other by a distance h3, in which the first pattern emission unit 120 emits the first patterned light downward, and the second pattern emission unit emits the second patterned light upward, such that the first patterned light intersects the second patterned light.

The image acquisition unit 140 is provided below the second pattern emission unit 130 and is spaced apart therefrom by a distance h2, and captures a forward image of the main body 10 at a view angle of θs with respect to a vertical direction. The image acquisition unit 140 is installed at a position spaced apart from a bottom surface by a distance h1. In consideration of a bumper (not shown) formed at the front bottom end of the main body 10 of the mobile robot 1, or a shape of structure for traveling or cleaning, the image acquisition unit 140 is desirably installed at a position that does not interrupt photographing of a forward image.

The first pattern emission unit 120 or the second pattern emission unit 130 is installed such that an optical axis of lenses included in the pattern emission unit 120 and the pattern emission unit 130 is oriented to form a constant emission angle. The first pattern emission unit 120 emits the first patterned light P1 downward at a first emission angle θr1; and the second pattern emission unit 130 emits the second patterned light P2 at a second emission angle θr2. In this case, the first emission angle and the second emission angle are generally different from each other, but may be identical to each other in some cases. The first emission angle and the second emission angle are desirably set in a range of 50° to 75°, but are not limited thereto. For example, the first emission angle may be set in a range of 60° to 70°, and the second emission angle in a range of 50° to 55°. The emission angle may be changed depending on the structure of a bumper at a lower portion of the mobile robot 1, a lower object detection distance, and the height of an upper portion to be detected.

When the patterned light, emitted by the first pattern emission unit 120 and/or the second pattern emission unit 130, is incident on an obstacle, the positions of the optical patterns P1 and P2 vary depending on the distance between the obstacle and the first pattern emission unit 120. For example, when the first patterned light P1 and the second patterned light P2 are incident on a specific obstacle, as the obstacle is located closer to the mobile robot 1, the first optical pattern P1 is displayed at a higher position in the acquired image, whereas the second optical pattern P2 is displayed at a lower position. That is, data on distances to obstacles is stored in advance, the data corresponding to a row of pixels forming an image (line of pixels arranged in a transverse direction) generated by the image acquisition unit 140, and when the optical patterns P1 and P2, detected from the image acquired by the image acquisition unit 140, are detected in a specific row, the location of an obstacle may be estimated based on the data on distances to obstacles corresponding to the row.

The image acquisition unit 140 is arranged such that the optical axis of the lens is oriented in a horizontal direction, and θs illustrated in FIG. 7 indicates an angle of view, and is set at a value equal to or higher than 100°, preferably in a range of 100° to 110°, but is not limited thereto. Further, the distance from the floor of an area to be cleaned to the image acquisition unit 140 may be set in a range of approximately 60 mm to 70 mm. In this case, in the image acquired by the image acquisition unit 140, the floor of the area to be cleaned is displayed after D1, and on the floor displayed on the acquired image, D2 is where the first optical pattern P1 is displayed. In this case, when there is an obstacle at D2, an image of the obstacle, on which the first patterned light P1 is incident, may be acquired by the image acquisition unit 140. In the case where an obstacle is closer to the mobile robot 1 than D2, the first optical pattern, corresponding to the emitted first patterned light P1, is displayed at a higher position than a reference position ref1.

The reference position ref1 is a position where the first optical pattern is displayed when the main body 10 is placed on a flat surface. When the first optical pattern is emitted to D2, the image acquisition unit 140 may be set as a position where the first optical pattern is captured. The reference position ref1 is a reference to determine a normal state, i.e., a state where there is no obstacle in front of the main body 10 and the floor is a flat surface.

Here, the distance from the main body 10 to D1 is preferably in a range of 100 mm to 150 mm; and the distance from the main body 10 to D2 is preferably in a range of 180 mm to 280 mm, but the distance is not limited thereto. D3 indicates a distance from the most protruding part of the front surface of the main body 10 to a position where the second patterned light is incident. The main body 10 detects an obstacle while moving, such that D3 is a minimum distance required to allow the main body 10 to detect an obstacle, located forward (upward) of the main body 10, without colliding with the obstacle.

In the case where the first optical pattern P1 was once displayed on the acquired image, and then disappears in a normal state while the main body 10 travels, or the first optical pattern is only partially displayed, the obstacle information obtainer 220 determines that there is a cliff near the mobile robot 1. In the case where the first optical pattern is not displayed on the acquired image, the obstacle information obtainer 220 may identify a cliff located in front of the mobile robot 1. In the case where there is a cliff (for example, stairs) in front of the mobile robot 1, the first patterned light is not incident onto the floor, such that the first optical pattern P1 disappears from the acquired image.

Based on a length of D2, the obstacle information obtainer 220 may determine that there is a cliff in front of the main body 10 at a position spaced apart from the main body 10 by D2. In this case, when the first patterned light P1 is in a cross shape, only the vertical line is displayed without the horizontal line, such that the obstacle information obtainer 220 may determine the cliff.

Further, in the case where a portion of the first optical pattern is not displayed, the obstacle information obtainer 220 may determine that there is an obstacle on the left side or the right side of the mobile robot 1. In the case where a portion of the right side of the first optical pattern is not displayed, the obstacle information obtainer 220 may determine that the cliff is located on the right side thereof. Accordingly, based on the identified cliff information, the travel control unit 230 may control the travel driving unit 300 so that the mobile robot 1 may travel along a path that does not lead to the cliff.

In addition, in the case where there is a cliff in front of the mobile robot 1, the travel control unit 230 may control the mobile robot 1 to move forward a distance, for example, the distance D2 or a distance shorter than the distance D2, to identify again the presence of a cliff by using a cliff sensor installed on the bottom of the main body 10. The mobile robot 1 may first identify a cliff based on the acquired image, and then may identify the cliff a second time by using the cliff sensor after traveling a predetermined distance.

Figure 8:
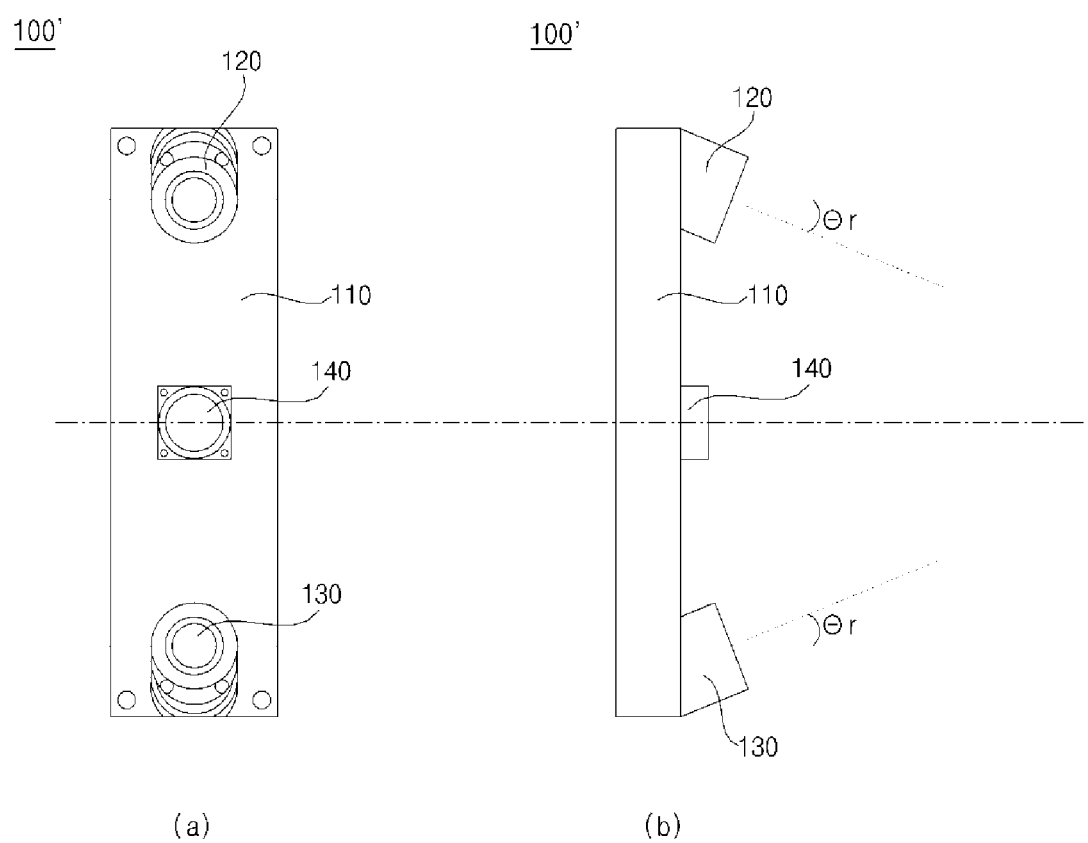
FIG. 8 is a front view and a lateral view of an obstacle detection unit according to a second exemplary embodiment of the present disclosure.
Figure 9:
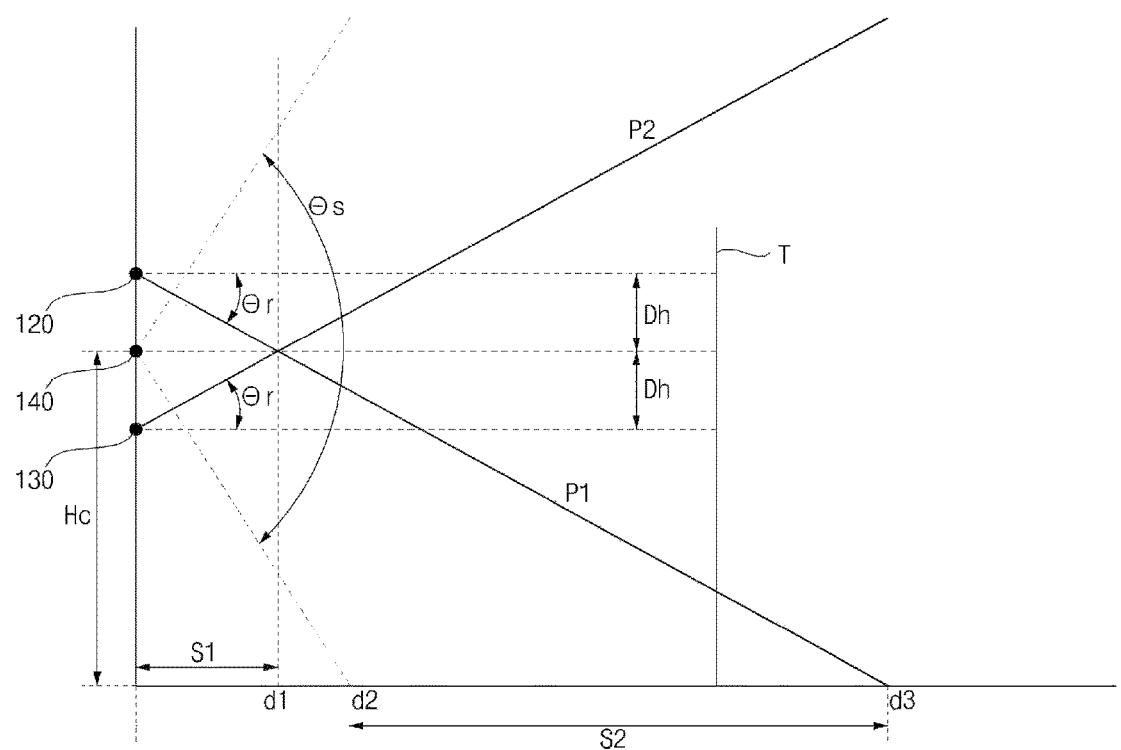
FIG. 9 is a diagram illustrating a pattern emission range and an obstacle detection range of the obstacle detection unit illustrated in FIG. 8.

FIG. 8 is a front view and a lateral view of an obstacle detection unit according to a second exemplary embodiment of the present disclosure; and FIG. 9 is a diagram illustrating a pattern emission range and an obstacle detection range of the obstacle detection unit illustrated in FIG. 8. As illustrated in portions (a) and (b) of FIG. 8, an obstacle detection unit 100' according to the second exemplary embodiment includes a first pattern emission unit 120, a second pattern emission unit 130, and an image acquisition unit 140. The same reference numerals will be used to indicate the same elements as those of the obstacle detection unit 100 according to the first exemplary embodiment, and description of the same elements will be omitted.

The obstacle detection unit 100' may further include a module frame 110 which is fixed at a front portion of the casing 11 and is vertically elongated, but in some embodiments, the first pattern emission unit 120, the second pattern emission unit 130, and/or the image acquisition unit 140 may be directly fixed to the casing 11 without the module frame 110.

In the obstacle detection unit 100' according to the second exemplary embodiment, the first pattern emission unit 120, the image acquisition unit 140, and the second pattern emission unit 130 may be arranged in a line. In this case, the image acquisition unit 140 is desirably interposed between the first pattern emission unit 120 and the second pattern emission unit 130. The first pattern emission unit 120, which is provided at the top, emits the first patterned light downward and forward from the main body 10; and the second pattern emission unit 130, which is provided at the bottom, emits the second patterned light upward and forward from the main body 10. The first patterned light P1 may be emitted to the floor of an area to be cleaned. The second patterned light P2 may be emitted to an obstacle located at a position higher than at least the second pattern emission unit 130 from the floor of the area to be cleaned, or may be emitted to a portion of the obstacle.

The image acquisition unit 140 may acquire a forward image of the main body 10. Particularly, the first patterned light P1 and the second patterned light P2 are displayed on the image (hereinafter referred to as an acquired image) acquired by the image acquisition unit 140, in which images of the first patterned light P1 and the second patterned light P2 displayed on the acquired image will be hereinafter referred to as optical patterns; and as the optical patterns are images, projected on the image sensor, of the first patterned light P1 and the second patterned light P2 incident on an actual space, the same reference numerals as the first patterned light P1 and the second patterned light P2 will be given to a first optical pattern P1, which corresponds to the first patterned light P1, and a second optical pattern P2, which corresponds to the second patterned light P2.

As illustrated in FIG. 9, in the obstacle detection unit 100' according to the second exemplary embodiment, the first pattern emission unit 120 may be provided above the image acquisition unit 140 at a position spaced apart from the image acquisition unit 140 by a distance Dh; and the second pattern emission unit 130 may be provided below the image acquisition unit 140 at a position spaced apart from the image acquisition unit 140 by the same distance Dh. An angle formed between a horizontal line and the emission direction of the first pattern emission unit 120 or the second pattern emission unit 130 will be defined as a vertical emission angle. Specifically, the vertical emission angle may be defined as an angle formed between a horizontal line and the direction of the optical axis of lenses included in each of the pattern emission units 120 and 130.

A first vertical emission angle of the first pattern emission unit 120 and a second vertical emission angle of the second pattern emission unit 130 may have the same value of θr. The first pattern emission unit 120 emits the first patterned light P1 at a downward angle θr with respect to the horizontal line; and the second pattern emission unit 130 emits the second patterned light P2 at an upward angle θr with respect to the horizontal line. The angle θr is preferably set in a range of 20° to 30°, but is not limited thereto.

As described above, the first pattern emission unit 120 and the second pattern emission unit 130 are provided to be symmetrical to each other with the image acquisition unit 140 interposed therebetween, and the first pattern emission unit 120 and the second pattern emission unit 130 are configured to emit light at the same vertical emission angle θr, but in opposite directions.

Such symmetrical structure allows for easy calibration or initialization of a product. In the case where the patterned light, emitted by the first pattern emission unit 120 or the second pattern emission unit 130, is incident on an obstacle, positions of the optical patterns P1 and P2 may vary depending on the distance from the obstacle to the first pattern emission unit 120. For example, when the first patterned light P1 and the second patterned light P2 are incident on a specific obstacle, as the obstacle is located closer to the mobile robot 1, the first optical pattern P1, particularly a horizontal line pattern Ph, is displayed at a higher position in the acquired image, whereas the second optical pattern P2 is displayed at a lower position. That is, data on distances to obstacles is stored in advance, the data corresponding to a row of pixels (line of pixels arranged in a transverse direction) forming an image generated by the image acquisition unit 140, and when the optical patterns P1 and P2, detected from the image acquired by the image acquisition unit 140, are detected in a specific row, the location of an obstacle may be estimated based on the data on distances to obstacles corresponding to the row.

However, in order to perform such process precisely, it is a prerequisite to arrange the first pattern emission unit 120 and the second pattern emission unit 130 to precisely emit light at a predetermined vertical emission angle θr. Such prerequisite may be checked during calibration. The calibration process may be performed as follows. The obstacle detection unit 100' is fixed, and an incident plate T (see FIG. 7) having a plane surface is vertically provided in front of the obstacle detection unit 100' with a predetermined distance therebetween. The incident plate T is desirably located at a position where the first patterned light P1 may be incident.

Subsequently, light is emitted by the first pattern emission unit 120, and an image is acquired by the image acquisition unit 140. The acquired image has the first optical pattern P1 incident on the incident plate T. In this case, the distance from the obstacle detection unit 100 to the incident plate T is already known, such that in the case where the obstacle detection unit 100' is normally manufactured without fault, a horizontal line Ph of the first optical pattern P1 is required to be displayed at a designated position ref1 (hereinafter referred to as a reference position) on the acquired image.

An emission direction of the second pattern emission unit 130 may be checked by inverting the obstacle detection unit 100' so that the obstacle detection unit 100' is upside down, and then by repeating the above-described calibration process. That is, after the obstacle detection unit 100' is inverted, and the second pattern emission unit 130 is located above the image acquisition unit 140, the second pattern emission unit 130 emits light, and the image acquisition unit 140 acquires an image, in which the second optical pattern P2 projected on the incident plate T is displayed. In this case, if the second pattern emission unit 130 is in a normal condition, the second optical pattern P2 will be detected at the reference position ref1. The image acquisition unit 140 is arranged such that the optical axis of the lens is oriented in a horizontal direction, and θs indicates an angle of view of the image acquisition unit 140, and is set at a value equal to or higher than 100°, preferably in a range of 100° to 110°, but is not limited thereto. Such calibration process is also applied to the obstacle detection unit 100 according to the first exemplary embodiment.

Further, the distance from the floor of an area to be cleaned to the image acquisition unit 140 may be set in a range of approximately 145 mm to 155 mm. In this case, in the image acquired by the image acquisition unit 140, the floor of the area to be cleaned is displayed after a point indicated as D2, and on the floor displayed in the acquired image, S2 is a region from the center of the first optical pattern P1 (a point where the horizontal line Ph and the vertical line Pv intersect) to D3. Particularly, in the case where there is an obstacle in the region S2, the image acquisition unit 140 may acquire an image of the first patterned light P1 which is incident on the obstacle. In this case, the distance from the main body 10 to D2 is preferably set in a range of 100 mm to 120 mm, and D3 is located at a position spaced apart from the mobile robot 1 by approximately 400 mm, but is not limited thereto.

Further, S1 (region extending from the mobile robot 1 to D1) illustrated in FIG. 9 indicates a region where the position of the first optical pattern P1 and the position of the second optical pattern P2 are upside down. In the case where there is an obstacle in the region S1, the first patterned light P1 is located above the second patterned light P2 in the acquired image, in which D1 is located at a position spaced apart from the mobile robot 1 desirably by 70 mm to 80 mm, but is not limited thereto.

Figure 10:
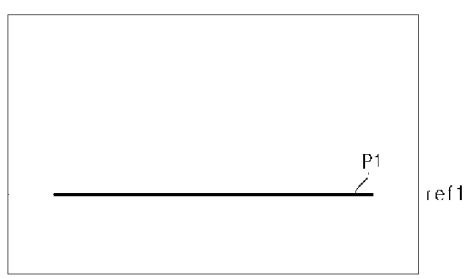
FIG. 10 is a diagram illustrating patterned light emitted by a first pattern emission unit illustrated in FIG. 1A.
Figure 10:
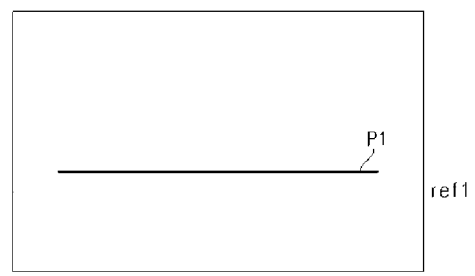
Figure 10:
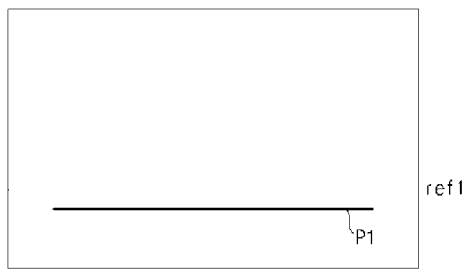
Figure 10:
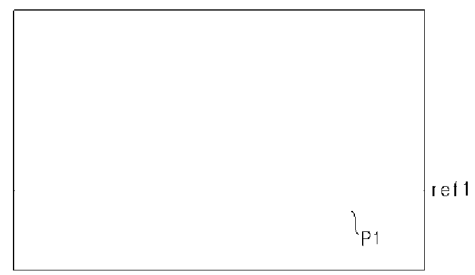
Figure 10:
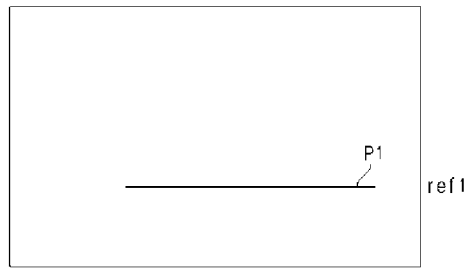

FIG. 10 is a diagram illustrating light emitted by a first pattern emission unit illustrated in FIG. 1A. Once an acquired image is input, the pattern detection unit 210 detects the first optical pattern or the second optical pattern from the acquired image input by the image acquisition unit 140, and transmits the detected first optical pattern or second optical pattern to the obstacle information obtainer 220. The obstacle information obtainer 220 analyzes the first optical pattern or second optical pattern, which is detected from the acquired image, and compares the position of the first optical pattern with the reference position ref1 to determine an obstacle.

As illustrated in portion (a) of FIG. 10, in the case where the horizontal line of the first optical pattern P1 is below the reference position 1, the obstacle information obtainer 220 determines that the mobile robot is in a normal state. The normal state refers to a state where the floor is flat and even, and there is no obstacle in front of the mobile robot, such that the mobile robot continues traveling. In the case where there is an obstacle in front of the mobile robot, the second optical pattern P2 is incident on the obstacle and is displayed on the acquired image, such that in a normal state, the second optical pattern P2 is generally not displayed.

As illustrated in portion (b) of FIG. 10, in the case where the horizontal line of the first optical pattern P1 is above the reference position ref1, the obstacle information obtainer 220 determines that there is an obstacle in front of the mobile robot. In the case where an obstacle is detected by the obstacle information obtainer 220 as illustrated in FIG. 10, the travel control unit 230 controls the travel driving unit 300 to bypass the obstacle while traveling. The obstacle information obtainer 220 may determine the position and size of the detected obstacle based on the positions of the first optical pattern P1 and the second optical pattern P2, and whether the second optical pattern P2 is displayed. In addition, the obstacle information obtainer 220 may determine the position and size of the obstacle based on a change in the first optical pattern and the second optical pattern displayed on the acquired image while traveling.

The travel control unit 230 may determine whether to continue traveling or bypass an obstacle based on the input information on the obstacle, and may control the travel driving unit 300 based on the determination. For example, in the case where the height of an obstacle is lower than a predetermined height, or in the case where it is passable through a space between an obstacle and a floor, the travel control unit 230 determines that it is possible to continue traveling.

As illustrated in portion (c) of FIG. 10, the first optical pattern P1 may be displayed at a lower position than the reference position ref1. In the case where the first optical pattern P1 is displayed at a lower position than the reference position ref1, the obstacle information obtainer 220 determines that there is a downhill slope. In the case where there is a cliff, the first optical pattern P1 disappears, such that a downhill slope may be differentiated from a cliff. In the case where the first optical pattern is not displayed as illustrated in portion (d) of FIG. 10, the obstacle information obtainer 220 determines that there is an obstacle in a traveling direction.

Further, in the case where a portion of the first optical pattern is not displayed as illustrated in portion (e) of FIG. 10, the obstacle information obtainer 220 may determine that there is a cliff on the left side or the right side of the main body 10. In the embodiment, the obstacle information obtainer 220 determines that there is a cliff on the left side of the main body 10. Moreover, in the case where the first optical pattern P1 is in a cross shape, the obstacle information obtainer 220 may determine an obstacle by considering both the position of the horizontal line and the length of the vertical line.

Figure 11:
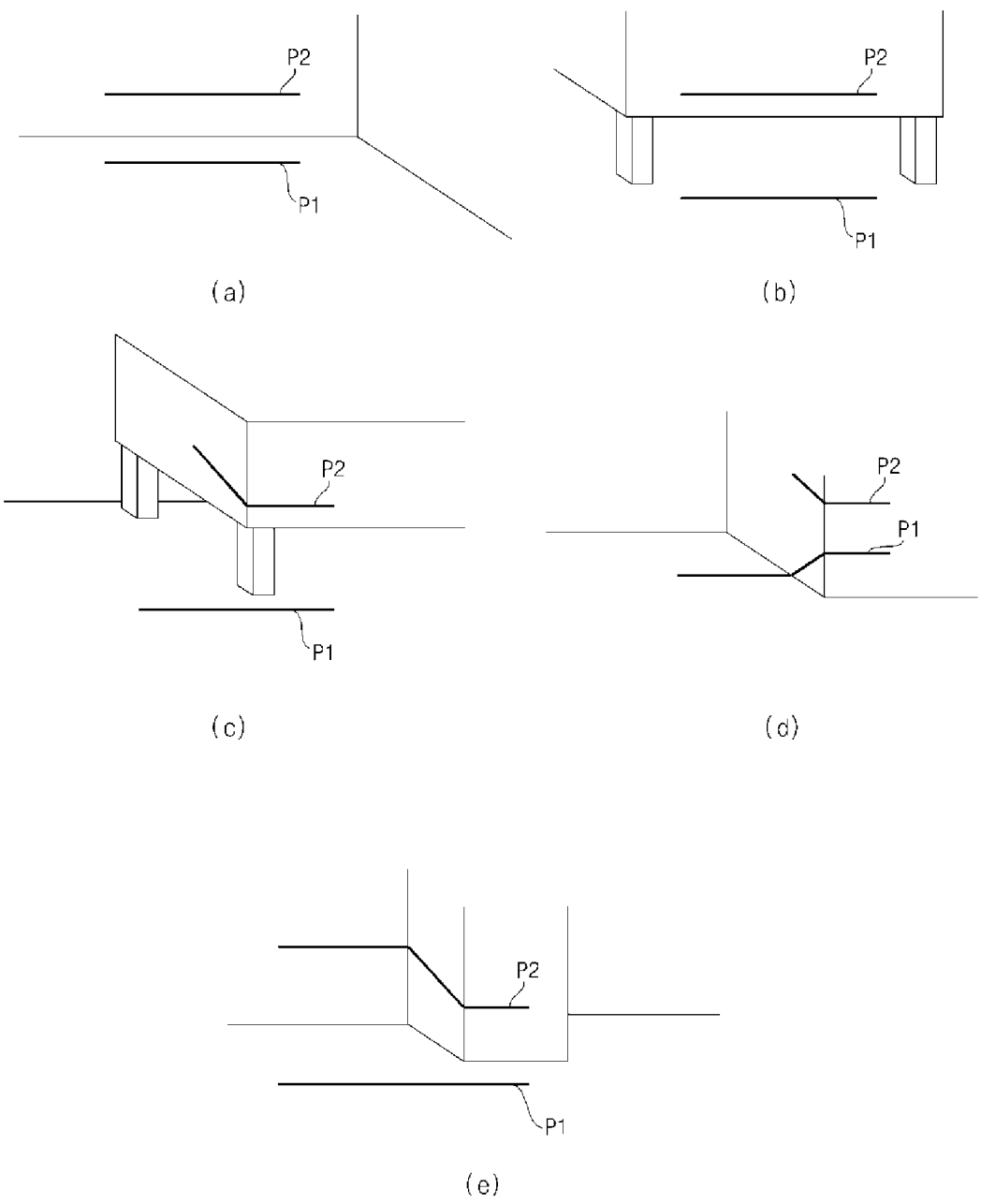
FIG. 11 is a diagram illustrating an example of a shape of a pattern emitted onto an obstacle of the mobile robot illustrated in FIG. 1A.

FIG. 11 is a diagram illustrating an example of a shape of a pattern emitted onto an obstacle of the mobile robot illustrated in FIG. 1A. As illustrated in FIG. 11, the obstacle information obtainer 220 may determine the position, size, and shape of an obstacle in such a manner that the patterned light, emitted by the obstacle detection unit 100, is incident on the obstacle, and an image displaying the optical pattern is acquired.

In the case where there is a wall in front of the mobile robot while traveling, as illustrated in portion (a) of FIG. 11, the first patterned light is incident on the floor, and the second patterned light is incident on the wall. Accordingly, the first optical pattern P1 and the second optical pattern P2 are displayed as two horizontal lines on the acquired image. In the case where the distance between the main body 10 and the wall is longer than D2, the first optical pattern P1 is displayed on the reference position ref1, but the second optical pattern is also displayed, such that the obstacle information obtainer 220 may determine that there is the obstacle.

In the case where the main body 10 moves closer to the wall, with the distance therebetween being less than D2, the first patterned light is incident not on the floor but on the wall, such that the first optical pattern is displayed on the acquired image at a position higher than the reference position ref1, and the second optical pattern is displayed above the first optical pattern. As the main body 10 moves closer to the obstacle, the second optical pattern is displayed at a lower position, such that the second optical pattern is displayed at a lower position compared to the case where the distance between the wall and the main body 10 is longer than D2; but the second patterned light is displayed above the reference position ref1 than the first optical pattern. Accordingly, the obstacle information obtainer 220 may calculate the distance from the main body 10 to the wall, which is an obstacle, based on the first optical pattern and the second optical pattern.

As illustrated in portion (b) of FIG. 11, in the case where there is an obstacle such as a bed, chest of drawers, and the like, the first patterned light P1 and the second patterned light P2 are incident on the floor and the obstacle respectively, as two horizontal lines. The obstacle information obtainer 220 determines the obstacle based on the first optical pattern and the second optical pattern. Based on the position of the second optical pattern, and a change of the second optical pattern, which is shown while the main body approaches the obstacle, the obstacle information obtainer 220 may determine a height of the obstacle. Then, the travel control unit 230 determines whether it is passable through a space below the obstacle, to control the travel driving unit 300 based on the determination.

For example, in the case where there is an obstacle, such as a bed, in an area to be cleaned, in which a space is formed between the obstacle and the floor, the travel control unit 230 may recognize the space, and may determine whether to pass through or bypass the obstacle by identifying the height of the space. In response to determination that the height of the space is less than the height of the main body 10, the travel control unit 230 may control the travel driving unit 300 so that the main body 10 may bypass the obstacle while traveling. By contrast, in response to determination that the height of the space is greater than the height of the main body 10, the travel control unit 230 may control the travel driving unit 300 so that the main body 10 may enter or pass through the space.

While the first optical pattern and the second optical pattern are also displayed as two horizontal lines in portion (a) of FIG. 11, the obstacle information obtainer 220 may differentiate the horizontal lines illustrated in portion (a) of FIG. 11 and the horizontal lines illustrated in portion (b) of FIG. 11, as the distance between the first optical pattern and the second optical pattern is different. Further, as illustrated in portion (a) of FIG. 11, as the main body 10 gets closer to an obstacle, the first optical pattern is displayed at a position higher than the reference position. However, as illustrated in portion (b) of FIG. 11, in the case of an obstacle located at a higher position, although the main body 10 moves closer to an obstacle by a predetermined distance, the first optical pattern P1 is displayed at the reference position ref1, and the position of the second optical pattern P2 is changed, such that the obstacle information obtainer 220 may differentiate the types of obstacle.

As illustrated in portion (c) of FIG. 11, in the case where an obstacle is a corner of a bed or chest of drawers, the first patterned light P1 is emitted to the floor as a horizontal line; and the second patterned light P2 is emitted to the corner of the obstacle, with a portion thereof being displayed as a horizontal line, and the remaining portion being incident on the obstacle and displayed as an oblique line. As the main body 10 moves further away from the obstacle, the second optical pattern is displayed at a higher portion, such that when the second patterned light P2 is incident on the side of the obstacle, the second optical pattern is displayed as an oblique line bending to an upper side than the horizontal line displayed in the case of emission to the front portion.

As illustrated in portion (d) of FIG. 11, in the case where the main body 10 moves closer to the corner of the wall by more than a predetermined distance, a portion of the first patterned light P1 is displayed as the horizontal line at a position higher than the reference position; a portion of the first patterned light P1 is emitted to the side of the corner, and is displayed as an oblique line bending to a lower side; and with respect to the floor, the first patterned light P1 is displayed as a horizontal line. As illustrated in portion (c) of FIG. 11, the second patterned light is displayed as a horizontal line and a portion of the second patterned light P1 emitted to the side of the corner is displayed as an oblique line bending to an upper portion.

Further, as illustrated in portion (e) of FIG. 11, with respect to an obstacle projecting from the surface of a wall, the first optical pattern is displayed as a horizontal line at the reference position ref1; and a portion of the second optical pattern P2 emitted on the projecting surface is displayed as a horizontal line, another portion thereof emitted to the side of the projecting surface is displayed as an oblique line bending to an upper side, and a remaining portion thereof emitted to the surface of a wall is displayed as a horizontal line. In this manner, based on the position and shape of the first patterned light and the second patterned light, the obstacle information obtainer 220 may determine the position, shape, and size (height) of the obstacle.

Figure 12:
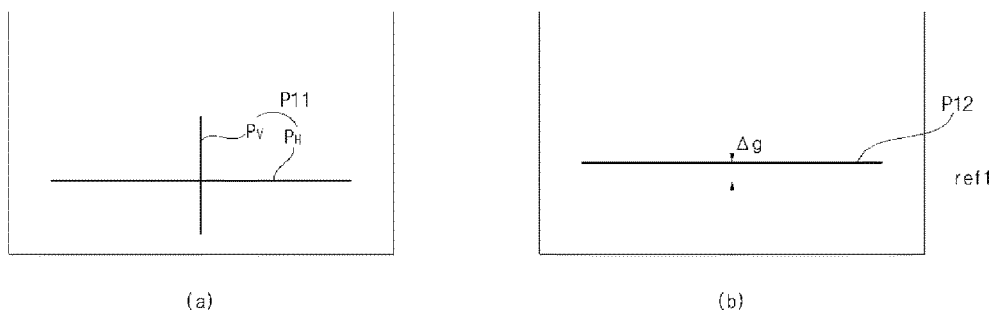
FIG. 12 is a diagram illustrating patterned light illustrated in FIG. 1B.

FIG. 12 is a diagram illustrating patterned light illustrated in FIG. 1B. In FIG. 12, portion (a) illustrates the first optical pattern P1 displayed on the acquired image, which is the case where the horizontal line Ph is detected at the reference position ref1.

As illustrated in portion (b) of FIG. 12, in the case where the second optical pattern P2 is displayed, on the acquired image, above the reference position ref1 by a distance Δg, a vertical emission angle of the second pattern emission unit 130 is smaller than a predetermined value θr, such that it is desired to adjust the vertical emission angle of the second pattern emission unit 130. However, if the distance Δg is in a predetermined error range, the distance Δg may be stored in a data storage, and then may be used later to obtain a distance from the position of the second optical pattern P2, displayed on the acquired image, to an obstacle, in which the distance may be obtained more precisely by compensating for the position of the second optical pattern P2 using the distance Δg.

Figure 13:
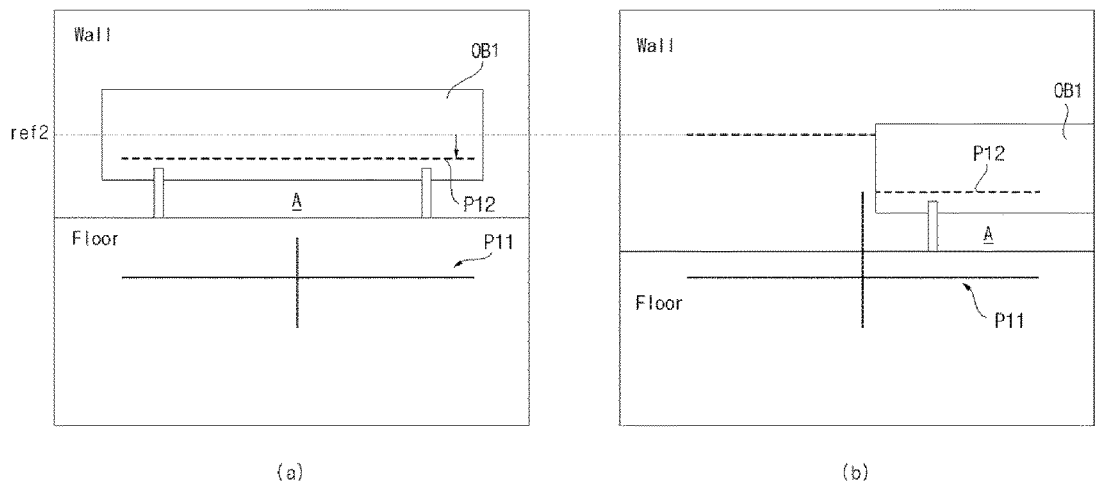
FIG. 13 is a diagram illustrating an image acquired according to a change in position of the mobile robot illustrated in FIG. 1B.

FIG. 13 is a diagram illustrating an image acquired according to a change in position of the mobile robot illustrated in FIG. 1B. In FIG. 13, portion (a) illustrates an image acquired in the case where the mobile robot is at position 1, and obstacle 1 is in front of the mobile robot; and (b) illustrates an image acquired in the case where the position of the mobile robot is changed to position 2. In the case where there is an obstacle OB1, such as a bed, in an area to be cleaned, with a space A being formed between the obstacle OB1 and the floor, the space A may be recognized, and the height of the space A may be desirably identified, such that it may be determined whether to pass through or bypass the obstacle OB1.

For example, as illustrated in portion (a) of FIG. 13, in the case where the alternative first patterned light P11 is incident on the floor in the space A, and the alternative second patterned light P12 is incident on a structure (for example, frame supporting a bed mattress) positioned on the space A, the obstacle information obtainer 220 included in the controller 200 may recognize that there is an obstacle above a portion where the alternative first patterned light P11 is incident, and particularly, may determine the distance from the mobile robot 1 to the obstacle OB1 based on the position of the alternative second optical pattern P12 displayed on the acquired image. Further, the vertical emission angle of the second pattern emission unit 130 is constant, such that based on the distance from the mobile robot 1 to the obstacle OB1, the obstacle information obtainer 220 may determine a height from the floor of an area to be cleaned to a portion where the second patterned light P2 is incident. Accordingly, based on these types of information, the obstacle information obtainer 220 may determine the height of the space A. In response to determination that the height of the space A is less than the height of the main body 10, the travel control unit 230 may control the travel driving unit 300 so that the main body 10 may bypass the obstacle OB1; by contrast, in response to determination that the height of the space A is greater than the height of the main body 10, the travel control unit 230 may control the travel driving unit 300 so that the main body 10 may enter or pass through the space A.

As illustrated in portion (b) of FIG. 13, in the case where the vertical line Pv of the alternative first patterned light extends to the wall, the horizontal line Ph is incident on the floor, and the alternative second patterned light P12 is partially incident on the obstacle OB1, such that a portion of the second patterned light P2 is incident on the obstacle OB1, with other portion thereof being incident on the wall, the obstacle information is obtained based on only the alternative first optical pattern P11 displayed on the acquired image if there is no second pattern emission unit 130. In this case, only the fact that there is a wall in front of the mobile robot may be identified. However, as illustrated in the exemplary embodiment, the second pattern emission unit 130 is provided, thereby further identifying that there is the obstacle OB1 between the mobile robot 1 and the wall. Particularly, based on the alternative second patterned light P12 including the horizontal line Ph, the obstacle OB1 may be detected over a wider region in a horizontal direction, thereby enabling detection of the obstacle OB1 positioned in a region which is not within reach of the vertical line Pv of the alternative first patterned light P11.

Figure 14:
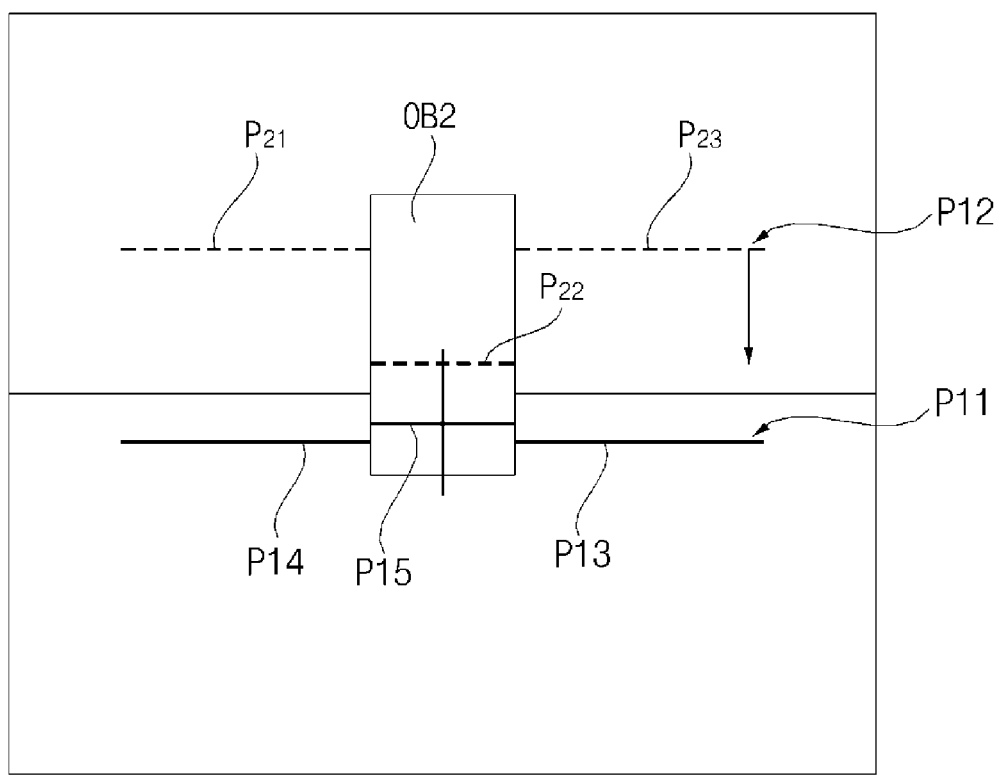
FIG. 14 is a diagram illustrating an acquired image of patterned light emitted onto an obstacle of the mobile robot illustrated in FIG. 1B.

FIG. 14 is a diagram illustrating an acquired image of patterned light emitted onto an obstacle of the mobile robot illustrated in FIG. 1B. Referring to FIG. 14, the mobile robot 1 according to an exemplary embodiment may specifically identify a stereoscopic shape of an obstacle based on the alternative second patterned light P12, in addition to the obstacle information identified based on the alternative first patterned light P11. For example, an actual height of an obstacle OB2 is too high for the mobile robot 1 to pass over while traveling, but at the current position of the mobile robot 1, the alternative first optical pattern P11 is incident on a lower portion of the obstacle. In this case, if there is no second pattern emission unit 13, the travel control unit 230 determines that the main body 10 may pass over the obstacle OB2, and first controls the main body 10 to travel toward the obstacle OB2; and as the main body 10 moves closer to the obstacle OB2, the position of the alternative second optical pattern P12 is gradually increased on the acquired image, such that upon determining that the height of the obstacle OB2 is at a higher level than a height at which the main body 10 may pass over, the travel control unit 230 controls the travel driving unit 300 so that the main body 10 may bypass the obstacle OB2.

By contrast, as in the exemplary embodiment, the second pattern emission unit 130 is provided, and the alternative second patterned light P12 is incident on the obstacle OB2 at the current position of the mobile robot 1, such that the height of the obstacle OB2 may be identified in advance, and a traveling path may be further optimized as well.

The obstacle information obtainer 220 may recognize a cliff, located in front of the mobile robot 1, based on the length of the vertical line Pv displayed on the acquired image. In the case where there is a cliff (for example, stairs) in front of the mobile robot 1, a front end of the horizontal line may extend to a portion below the cliff, and a portion emitted to the portion below the cliff is not displayed on the acquired image, such that the length of the vertical line Pv, displayed on the acquired image, is decreased. Accordingly, in the case where the length of the vertical line Pv is decreased, the obstacle information obtainer 220 may determine that the there is a cliff in front of the mobile robot 1, and based on the determination, the travel control unit 230 may control the travel driving unit 300 so that the mobile robot 1 may travel along a path that does not lead to the cliff. Further, in the case where a portion of the horizontal line Ph (P13 to P15) is not displayed on the acquired image, the obstacle information obtainer 220 may determine that there is a cliff on the left side or the right side of the main body.

Figure 15:
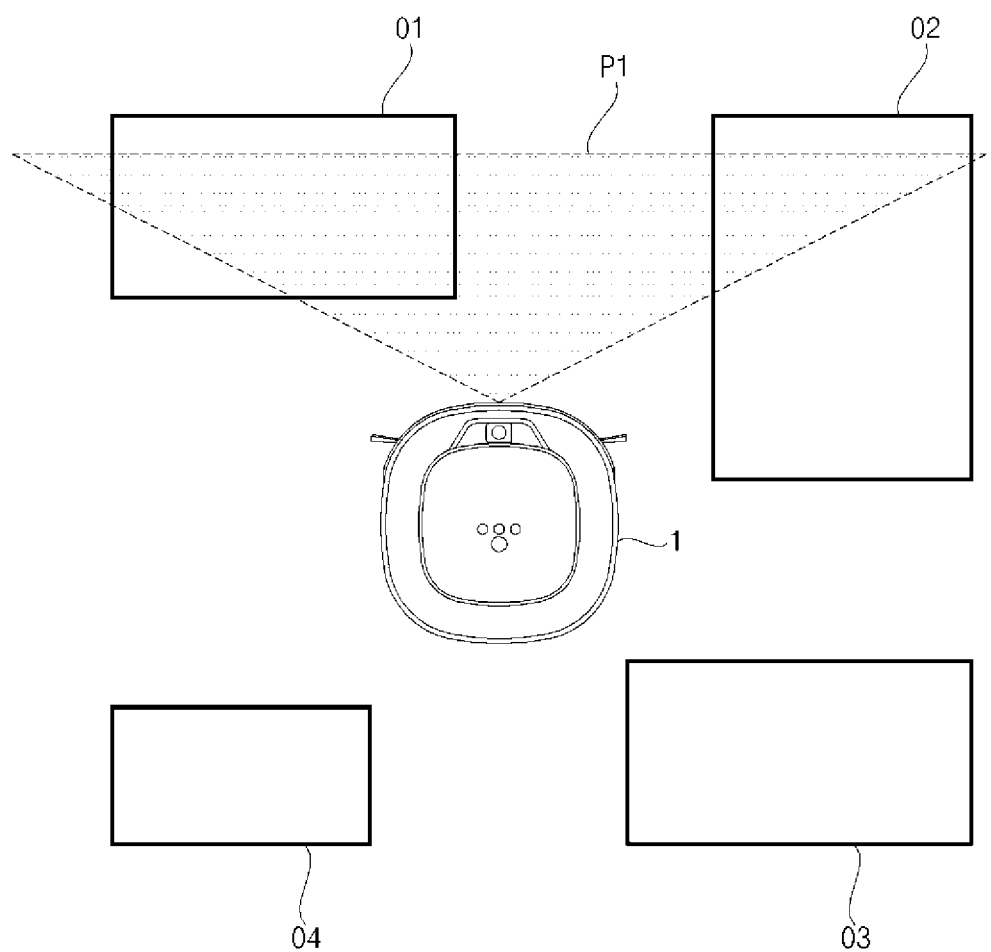
FIG. 15 is a diagram referred to in the description of a stuck state of a mobile robot according to an exemplary embodiment of the present disclosure.

FIG. 15 is a diagram referred to in the description of a stuck state of a mobile robot according to an exemplary embodiment of the present disclosure. As illustrated in FIG. 15, while cleaning or traveling, the mobile robot 1 may enter an area where a plurality of obstacles 01 to 04 are present. For example, when the mobile robot 1 enters an area, such as an area under the chair or under the table, which is surrounded by legs of the chair or the table, or surrounded by obstacles placed on the floor, and has a size equal to or smaller than a predetermined size, the mobile robot 1 may not travel because of such nearby obstacles, which leads to a stuck state.

The mobile robot 1 emits an optical pattern P1 and analyzes a pattern of an acquired image input by the obstacle detection unit 100; and based on the analysis, the mobile robot 1 determines the presence and location of an obstacle, and bypasses the obstacle while traveling. In the case where a plurality of obstacles are positioned adjacent to each other in an area having a size equal to or smaller than the predetermined size, the mobile robot 1, although bypassing one obstacle, encounters another one, such that it is difficult for the mobile robot 1 to bypass all the obstacles as the mobile robot 1 is required to repeatedly detect and bypass obstacles while remaining in the area for an extended period of time.

In the case where the mobile robot 1 may not travel due to the plurality of obstacles repeatedly within a predetermined distance, the controller 200 determines that the mobile robot 1 is in a stuck state (i.e., mobile robot 1 is has been a particular area for more than a particular length of time and/or has performed more than a threshold number of avoidance moves within the particular area), and sets an escape mode. Then, based on information on nearby obstacles, the controller 200 sets up an escape path, so that the mobile robot 1 may escape from the particular area.

Figure 16:
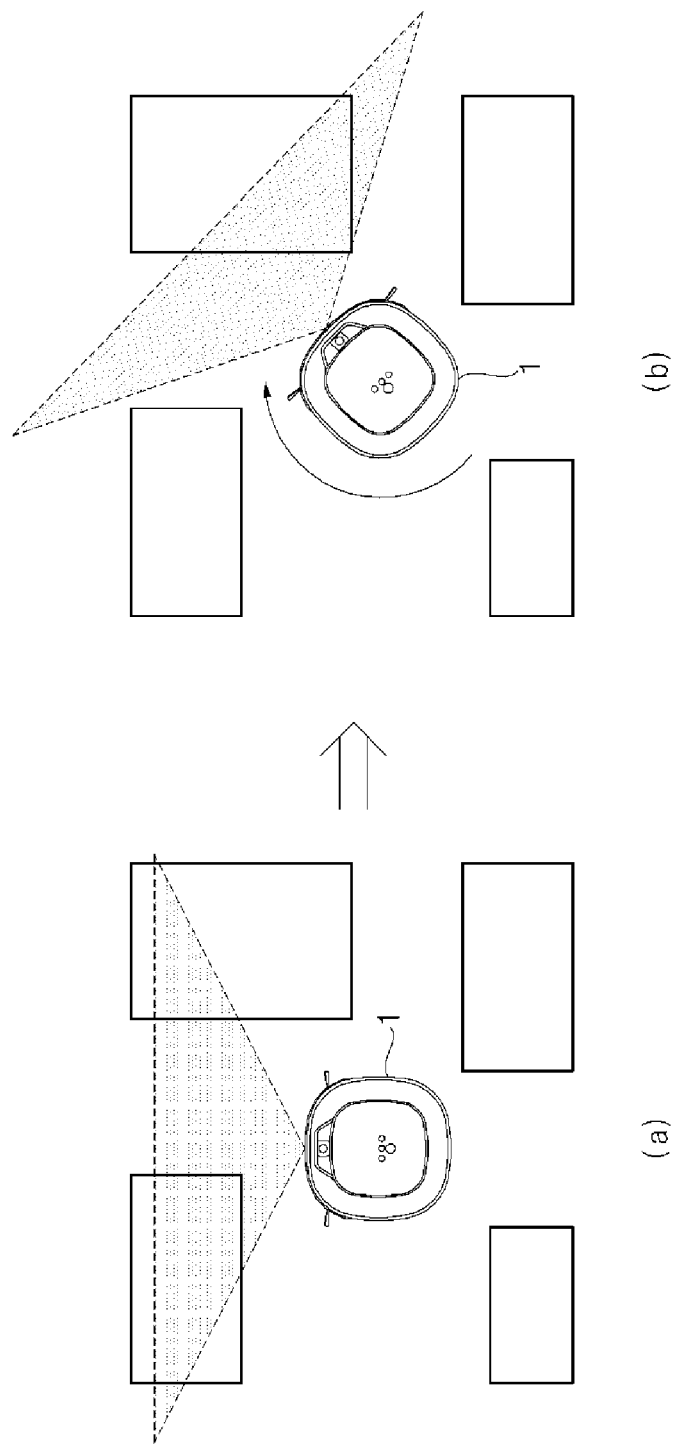
FIG. 16 is a diagram referred to in the description of an escape operation performed by a mobile robot to escape from the stuck state illustrated in FIG. 15.

FIG. 16 is a diagram referred to in the description of an escape operation performed by a mobile robot to escape from the stuck state illustrated in FIG. 15. As illustrated in portion (a) of FIG. 16, the mobile robot 1 detects an obstacle by recognizing an optical pattern of an acquired image, and first determines whether it is possible to bypass the detected obstacle while traveling. In the case where it is not possible to travel, the mobile robot 1 rotates at a predetermined distance to bypass the obstacle as illustrated in portion (b) of FIG. 16. Upon rotation, the mobile robot 1 detects another obstacle and determines again whether it is possible to travel. During the rotation at the predetermined distance, the mobile robot 1 analyzes a pattern of the acquired image, and obtains and stores information on the nearby obstacles.

Upon repeating the above process, if the mobile robot 1 is in a stuck state where the mobile robot 1 is surrounded by a plurality of obstacles and thus may not travel, the mobile robot 1 first determines whether it is a stuck state, and sets an escape mode. The controller 200 sets the escape mode, and analyzes pre-stored information on the nearby obstacles and the pattern of the acquired image. Then, the controller 200 determines whether there is a movable or passable path and sets up the path as an escape path. In the escape mode, the controller 200 sets up the escape path by determining whether it is possible to move or pass through, based on the size of a space between obstacles.

Figure 17:
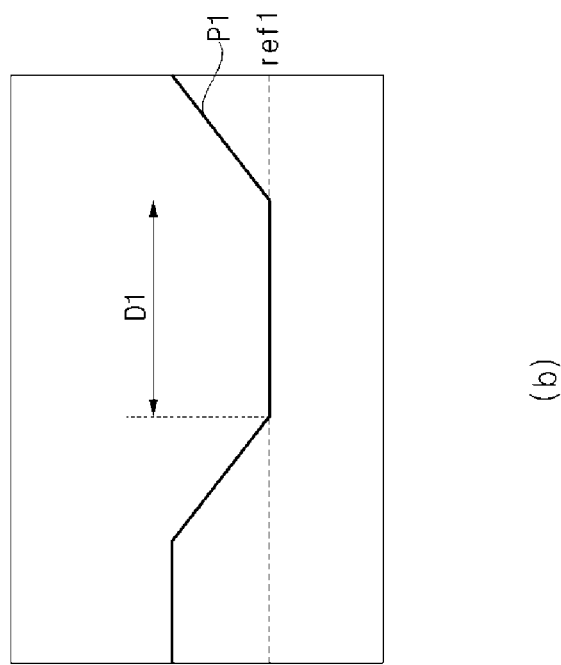
FIG. 17 is a diagram referred to in the description of an operation performed by a mobile robot to determine whether it is possible to pass through while the mobile robot is in the stuck state illustrated in FIG. 15.
Figure 17:
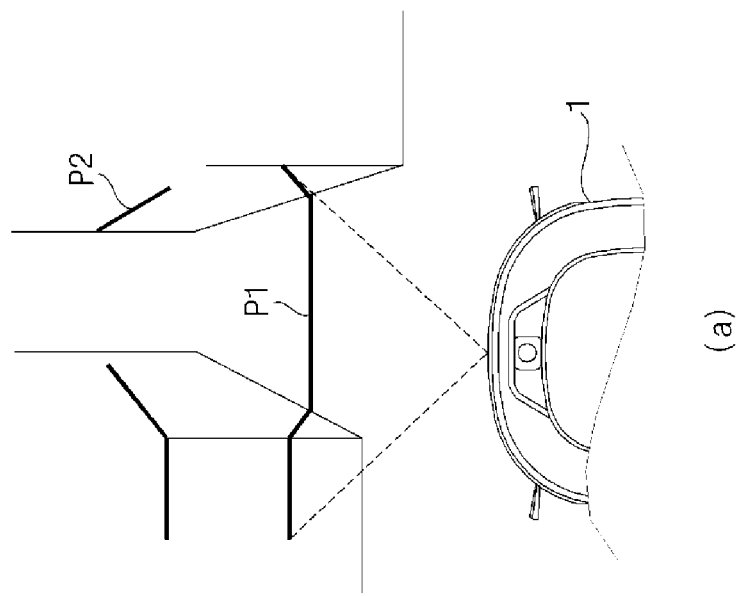

FIG. 17 is a diagram referred to in the description of an operation performed by a mobile robot to determine whether it is possible to pass through while the mobile robot is in the stuck state illustrated in FIG. 15. As illustrated in portion (a) of FIG. 17, in the escape mode of the mobile robot 1, the first pattern emission unit 120 and the second pattern emission unit 130 emit patterned light P1 and patterned light P2 forward of the mobile robot 1; and the image acquisition unit 140 captures and acquires an image of the patterned light P1 and patterned light P2 emitted to an obstacle.

The pattern detection unit 210 analyzes the acquired image and extracts an optical pattern emitted to the obstacle. The obstacle information obtainer 220 analyzes the optical pattern and obtains information on the obstacle, such as the size and shape of the obstacle, and the like. Based on the obtained information on the obstacle, the travel control unit 230 determines whether it is possible to travel or pass through, and sets up the escape mode so that the mobile robot 1 may bypass or pass through the obstacle.

In the case where the optical pattern P1 is displayed as illustrated in portion (b) of FIG. 17, in which the optical pattern P1 is not displayed at the reference position ref1 and is in an oblique line shape, the obstacle information obtainer 220 determines that there is an obstacle near the mobile robot 1. As both ends of the optical pattern P1 are positioned above the reference position ref1 with the central portion thereof being at the reference position ref1, the obstacle information obtainer 220 may determine that an obstacle is located on both the left side and the right side forward of the mobile robot 1.

In addition, as a portion of the optical pattern P1 is displayed at the reference position ref1, the obstacle information obtainer 220 determines that there is a space between the obstacle located on the left side and the obstacle located on the right side. In this case, the obstacle information obtainer 220 determines the width of the space between the obstacles based on the length of the pattern displayed at the reference position ref1.

The obstacle information obtainer 220 may determine the width of a space by converting the length of an optical pattern by using data on an actual size (length) of a space corresponding to a unit length (for example, 1 mm). The obstacle information obtainer 220 calculates the length D1 of the pattern (hereinafter referred to as straight pattern) displayed at the reference position among optical patterns, and inputs the calculated length D1 to the travel control unit 230.

The travel control unit 230 compares the length of the pattern input from the obstacle information obtainer 220, i.e., the length of a portion (straight pattern) of the optical pattern displayed at the reference position among the optical patterns of the acquired image, with a set length, to determine whether the mobile robot 1 may enter or travel. The set length is a reference value used to determine whether a width is wide enough for the mobile robot 1 to pass through, and is set based on a minimum width required for the main body to move. The set length is determined based on the size of the mobile robot 1, and is set at a value corresponding to a higher value than the width of the mobile robot 1. In this case, according to a determination method, the set length may be a value obtained by converting an actual length into a length of an optical pattern, and may be a value corresponding to an actual length between obstacles in some cases.

In the case where the length of the straight pattern is less than the set length, the travel control unit 230 determines that the mobile robot 1 may not enter the space, whereas in the case where the length of the straight pattern is greater than the set length, the travel control unit 230 determines that the mobile robot 1 may enter the space. If it is determined that the mobile robot 1 may not enter the space in response to the length of the straight pattern being less than the set length, the travel control unit 230 searches for a new path to bypass an obstacle in front of the mobile robot 1. Accordingly, the travel control unit 230 controls the mobile robot 1 to rotate at a predetermined angle, and searches for another obstacle or a new path.

In the escape mode, if the mobile robot 1 is set in a fast clean mode, and there is a path where the mobile robot 1 may pass, the travel control unit 230 controls the travel driving unit 300 to immediately pass through the path (i.e., without analyzing other obstacles within that path). Even when it is determined that the mobile robot 1 is in a stuck state, there may be a path where the mobile robot 1 has passed, or there may be a new path, such that the travel control unit 230 may set a path, through which the mobile robot 1 may pass, as an escape path, and attempts to escape.

When setting the escape mode, the travel control unit 230 initializes existing obstacle information, and may newly search for an obstacle. If a new obstacle is repeatedly detected, and there has been an attempt to bypass the detected obstacle, but the mobile robot 1 has failed to move normally, the travel control unit 230 determines that the mobile robot 1 is in the stuck state. In this case, the travel control unit 230 determines that the mobile robot 1 has failed to escape from the stuck state using the existing obstacle information, and initializes the existing information and then detects a new obstacle. In the escape mode, if the mobile robot 1 is set in a default mode, the travel control unit 230 generates a map of a surrounding area of the nearby obstacles, and searches for a movable path based on the generated map, to set the path as an escape path.

Figure 18:
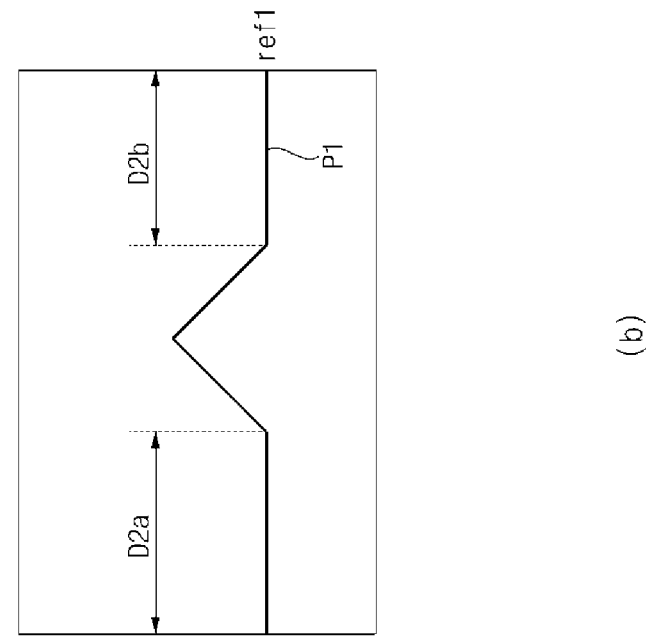
FIG. 18 is a diagram referred to in the description of an operation performed by a mobile robot to determine an obstacle while the mobile robot is in the stuck state illustrated in FIG. 15.
Figure 18:
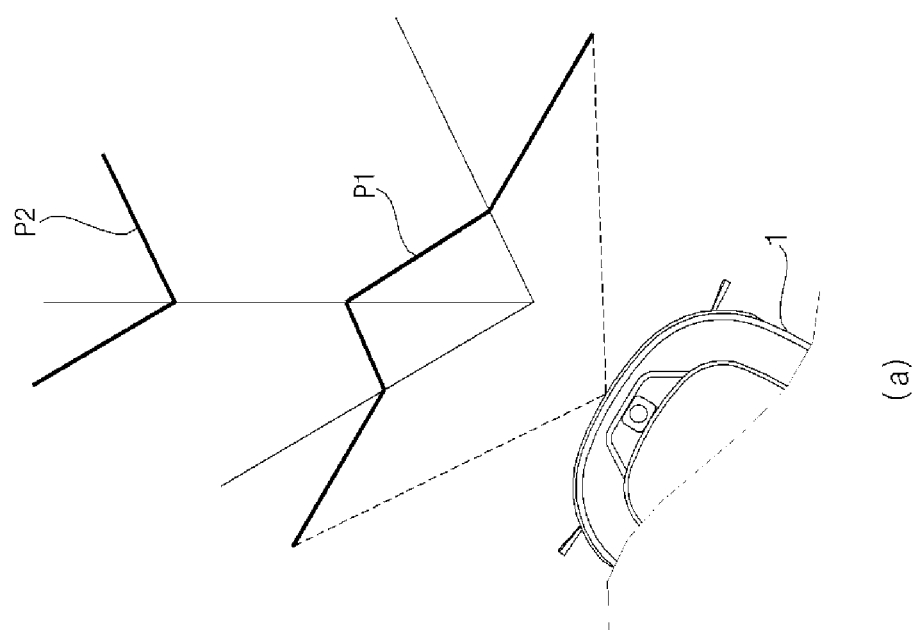

FIG. 18 is a diagram referred to in the description of an operation performed by a mobile robot to determine an obstacle while the mobile robot is in the stuck state illustrated in FIG. 15. As illustrated in portion (a) of FIG. 18, if a new obstacle appears while the mobile robot 1 rotates or travels to search for a new path, the patterned light, emitted by the pattern emission unit, is incident on the obstacle, and an optical pattern is displayed on the acquired image.

In the case where the mobile robot 1 moves toward the corner of the obstacle, the optical pattern P1 is displayed with its central portion being in a triangular shape and the left and right portions being displayed in a straight-line shape at the reference position ref1, as illustrated in portion (b) of FIG. 18. Based on the optical pattern P1, the obstacle information obtainer 220 may determine that there is an obstacle (corner) in front of the mobile robot 1, and there is no obstacle on the left side or the right side thereof. Accordingly, the travel control unit 230 may turn to the left or the right to search for a new path.

In this case, the obstacle information obtainer 220 may calculate the length of each straight pattern, displayed at the reference position, of the optical patterns, and may input the calculated length to the travel control unit 230. Based on lengths D2a and D2b of the straight patterns, the travel control unit 230 may determine whether the mobile robot 1 may pass through, and may set to turn either to the left or to the right. The length of the left and right straight patterns may be different depending on the position or angle of the mobile robot 1, such that even after rotating or traveling, it is required to continuously detect an obstacle to set a traveling direction. In the case where a new obstacle is detected, the obstacle information obtainer 220 stores information on the new obstacle, and inputs the information to the travel control unit 230. In response to the new obstacle, the travel control unit 230 changes an escape path.

The travel control unit 230 counts a number of times that the escape path is changed due to the new obstacle within a predetermined distance, and stores the number of times. In the case where obstacles are detected successively within a predetermined distance, the travel control unit 230 compares the number of times the escape path is changed with a predetermined number, and determines whether the mobile robot 1 has completely escaped.

Then, in the case where a new obstacle is detected after traveling more than a predetermined distance, the travel control unit 230 resets and recounts the number of times an escape path is changed. That is, the travel control unit 230 counts the number of times the escape path is repeatedly changed while the mobile robot 1 travels along a predetermined escape path within a predetermined distance; and in the case where the mobile robot 1 travels more than the predetermined distance, the travel control unit 230 determines that the mobile robot 1 moves away from the area, and resets the number of times. When determining a stuck state, the travel control unit 230 may set an escape mode in the same manner as above, if an obstacle is detected repeatedly in an area having a size equal to or smaller than a predetermined size.

Figure 19:
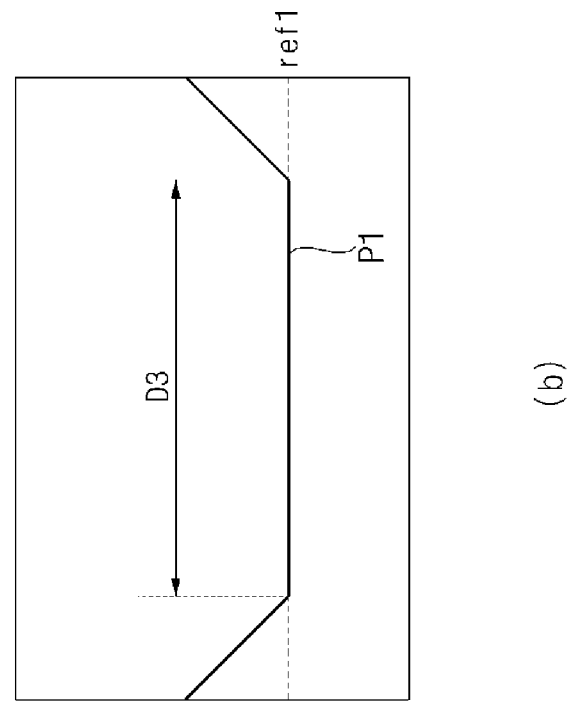
FIG. 19 is a diagram referred to in the description of an operation performed by a mobile robot to set up an escape path while the mobile robot is in the stuck state illustrated in FIG. 15.
Figure 19:
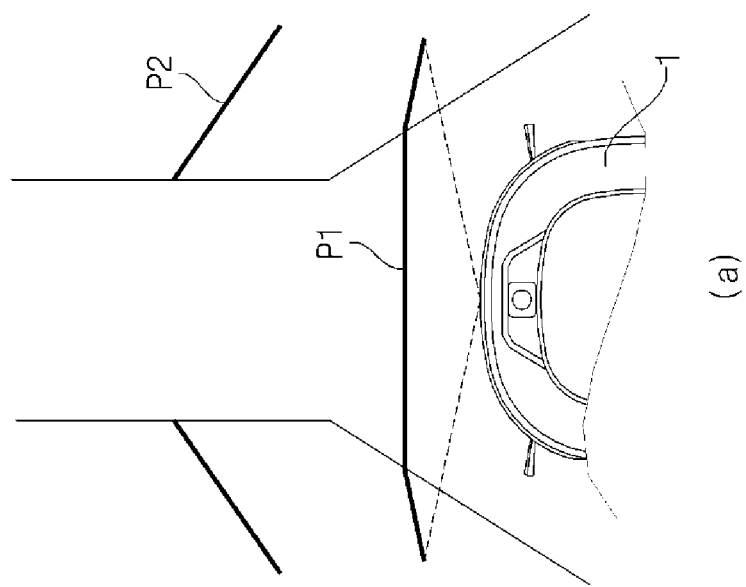

FIG. 19 is a diagram referred to in the description of an operation performed by a mobile robot to set up an escape path while the mobile robot is in the stuck state illustrated in FIG. 15. As illustrated in portion (a) of FIG. 19, while in the escape mode, if there is a space of a certain size between obstacles, the mobile robot 1 determines the size between the obstacles to determine whether to travel or pass through the space, as illustrated above in FIG. 17.

As illustrated in portion (b) of FIG. 19, the mobile robot 1 determines whether it is possible to travel according to a shape of an optical pattern extracted from the acquired image. As the left side and the right side of the optical pattern are displayed in an oblique line shape, the obstacle information obtainer 220 determines that there is an obstacle on both the left side and the right side of the mobile robot 1. Further, the obstacle information obtainer 220 calculates a length D03 of a central straight pattern, and inputs the calculated length to the travel control unit 230.

The travel control unit 230 compares the length D03 of the straight pattern with a set length, and in the case where the length of the straight pattern is greater than the set length, the travel control unit 230 determines that the mobile robot 1 may travel or pass through the space, and controls the mobile robot 1 to travel. Based on the straight length of the optical pattern, if the width of the space between the obstacles is wide enough for the mobile robot 1 to travel, the travel control unit 230 controls the travel driving unit 300 to set the path as an escape path and maintains traveling.

Based on the optical pattern of the acquired image which is continuously input even while traveling, the obstacle information obtainer 220 determines obstacle information. Based on the obstacle information input while traveling, the travel control unit 230 continuously determines whether it is possible to travel. In the case where the length of a central straight pattern is decreased, the travel control unit 230 determines again whether to travel. In this case, if the length is less than a set length, the travel control unit 230 determines that it is not possible to travel, and controls the mobile robot 1 to move backward. Depending on the size of a current space, if it is possible to rotate, the travel control unit 230 controls the mobile robot 1 to rotate to escape from the obstacle, and searches for a new path. In the case where the length of the straight pattern is maintained or increased, the travel control unit 230 maintains the current path.

Figure 20:
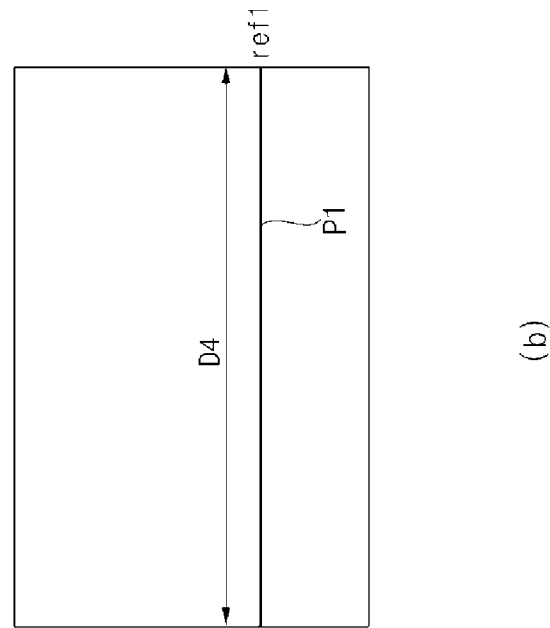
FIG. 20 is a diagram referred to in the description of an operation performed by a mobile robot to escape from the stuck state illustrated in FIG. 15.
Figure 20:
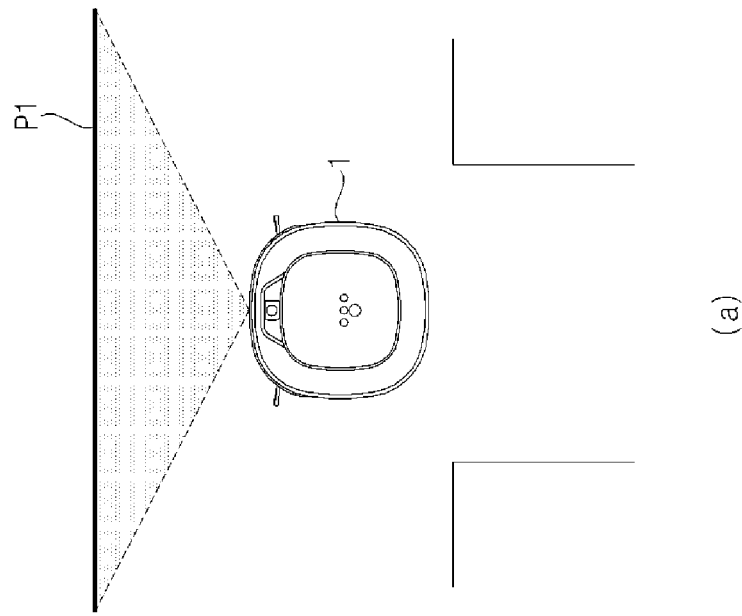

FIG. 20 is a diagram referred to in the description of an operation performed by a mobile robot to escape from the stuck state illustrated in FIG. 15. As illustrated in portion (a) of FIG. 20, the mobile robot 1 may travel in a space between obstacles, to escape from a stuck state. As illustrated in portion (b) of FIG. 20, in the case where an optical pattern is displayed in a straight line shape at the reference position ref1, the travel control unit 230 determines that the mobile robot 1 has escaped from the stuck state and cancels the escape mode; and according to an existing setting, the travel control unit 230 controls the mobile robot 1 to perform cleaning or to travel to a specific designation. Further, the travel control unit 230 may return to a charging station if charging is required.

The travel control unit 230 stores obstacle information associated with a stuck state and an escape path corresponding to the obstacle information, such that if an identical obstacle causes a stuck state, the travel control unit 230 determines, based on the obstacle information, whether the stuck state is caused by the identical obstacle, and attempts to escape by traveling along the escape path stored corresponding to the obstacle. If a new obstacle, which has not been stored, is detected, the travel control unit 230 updates the obstacle information, and may set up an escape path corresponding to the obstacle information.

Figure 21:
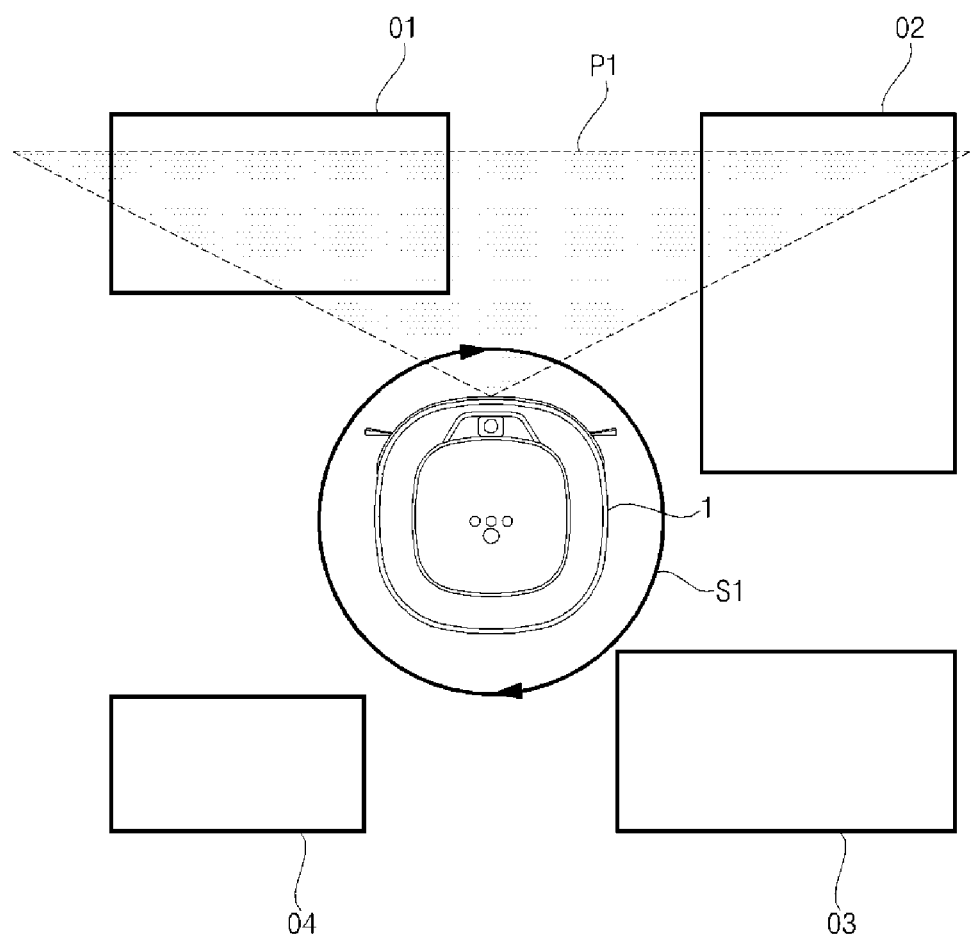
FIG. 21 is a diagram referred to in the description of an operation performed by a mobile robot to obtain information on a surrounding area while the mobile robot is in the stuck state illustrated in FIG. 15.

FIG. 21 is a diagram referred to in the description of an operation performed by a mobile robot to obtain information on a surrounding area while the mobile robot is in the stuck state illustrated in FIG. 15. In the case where the escape mode is set in response to a determination that the mobile robot 1 is in a stuck state, the mobile robot 1 rotates once at the current position to detect nearby obstacles as illustrated in FIG. 21. If it is not possible to rotate at the current position, the mobile robot 1 moves a predetermined distance, and rotates once.

In the case where the travel control unit 230 repeatedly detects obstacles, the travel control unit 230 determines that the mobile robot 1 is in the stuck state, and deletes and initializes pre-stored obstacle information. For example, since there may be a case where the mobile robot 1 repeatedly approaches an identical obstacle, or a case where there is a moving obstacle, the travel control unit 230 initializes obstacle information on a surrounding area.

In this case, the travel control unit 230 initializes obstacle information regarding obstacles located within a predetermined distance from the mobile robot 1, while maintaining information on areas which have been cleaned. The travel control unit 230 controls the travel driving unit 300 so that the mobile robot 1 rotates once.

As illustrated in FIG. 21, in the case where the mobile robot 1 rotates once S1 while there are a first obstacle 01 to a fourth obstacle 04, patterns shown above in portion (b) of FIG. 17, portion (b) of FIG. 18, and portion (b) of FIG. 19 are successively and repeatedly displayed. The obstacle information obtainer 220 analyzes the optical pattern, extracted from the acquired image input from the obstacle detection unit 100, and extracts information on obstacles located within a predetermined distance from the mobile robot 1.

Figure 22:
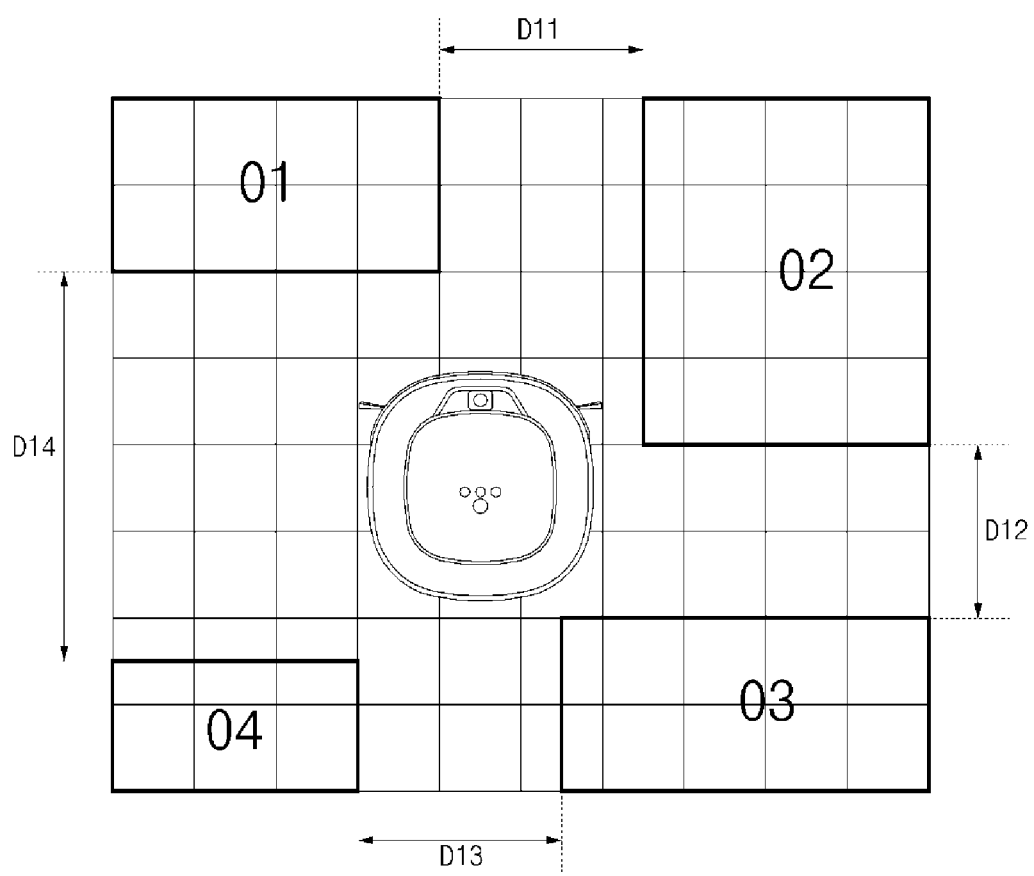
FIG. 22 is a diagram illustrating a map of a surrounding area that is generated by a mobile robot while the mobile robot is in the stuck state illustrated in FIG. 15.

FIG. 22 is a diagram illustrating a map of a surrounding area that is generated by a mobile robot while the mobile robot is in the stuck state illustrated in FIG. 15. As illustrated in FIG. 22, the obstacle information obtainer 220 generates a map of a surrounding area by using information on obstacles determined based on an optical pattern.

The obstacle information obtainer 220 analyzes the optical pattern, extracted from the acquired image input from the obstacle detection unit 100, and based on the analyzed optical pattern, determines the location and shape of obstacles located in the surrounding area. The obstacle information obtainer 220 compares the position where the optical pattern is displayed with the reference position ref1, to determine a distance to the obstacle; and based on the shape, for example, an oblique line shape, of the optical pattern, the obstacle information obtainer 220 may determine that there is an obstacle on the left side or the right side of the mobile robot 1, and based on a triangular shape of the optical pattern, the obstacle information obtainer 220 may determine a corner of a square.

Further, based on not only the first patterned light but also the second patterned light, the obstacle information obtainer 220 may detect an obstacle located at a high position, and may determine the height of the obstacle. In addition to the location and shape of obstacles, the obstacle information obtainer 220 determines the width D11 to D14 between obstacles, i.e., the size of a space between the obstacles, based on the length of the straight pattern displayed at the reference position as described above.

Upon generating the map of the surrounding area, the travel control unit 230 sets up an escape path to escape from the stuck state by bypassing an obstacle based on the generated map of the surrounding area. Based on the size of a space between obstacles, the travel control unit 230 determines whether the mobile robot 1 may travel, and sets up an escape path. In the case where the width of a space is wide enough for the mobile robot 1 to travel, the travel control unit 230 sets up the escape path, so that the mobile robot 1 may travel along the path. In this case, the travel control unit 230 sets a rotation angle and the like to control the mobile robot 1 to move to the location.

For example, in the case where the mobile robot 1, while being surrounded by the first to fourth obstacles 01 to 04, is in a stuck state, the width D14 between the first obstacle 01 and the fourth obstacle 04 is wide enough for the mobile robot 1 to travel, such that the travel control unit 230 may set up the escape path so that the mobile robot 1 may escape through a space between the first obstacle 01 and the fourth obstacle 04.

Upon setting up the escape path, the travel control unit 230 controls the travel driving unit 300 to travel along the escape path. In the case where a new obstacle is detected while traveling along the escape path, the travel control unit 230 changes the escape path based on information on the obstacle detected by the obstacle information obtainer 220, and controls the travel driving unit 300 to move along the changed escape path.

Figure 23:
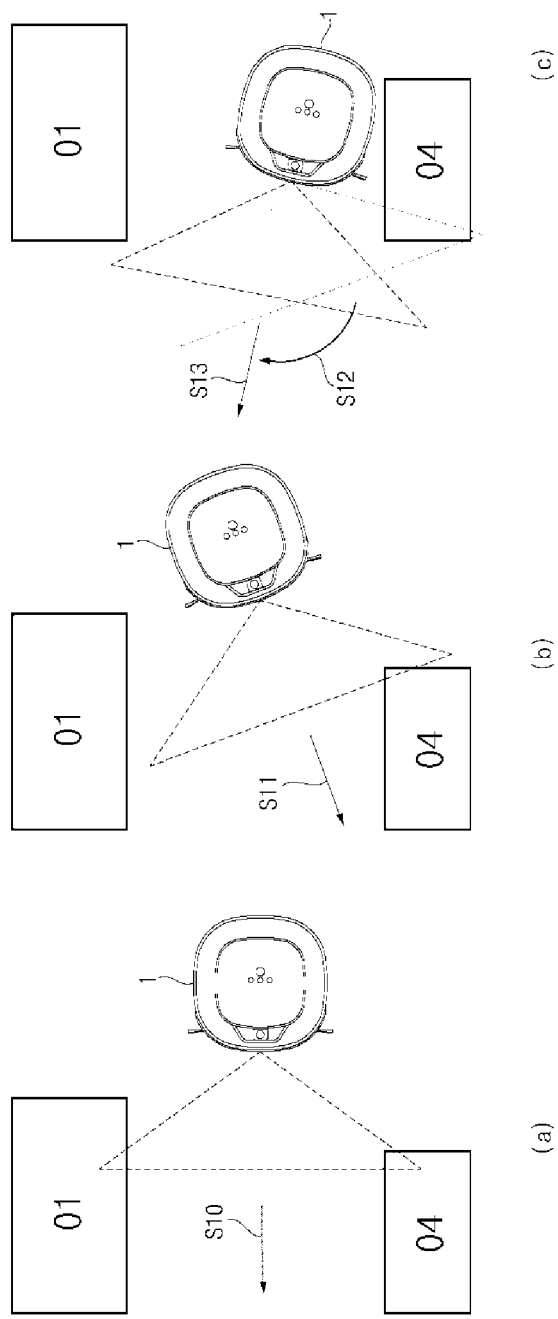
FIG. 23 is a diagram referred to in the description of a method to escape according to a mode of a mobile robot according to an exemplary embodiment of the present disclosure.

FIG. 23 is a diagram referred to in the description of a method to escape according to a mode of a mobile robot according to an exemplary embodiment of the present disclosure. As illustrated in portion (a) of FIG. 23, the mobile robot 1 moves to escape through a space between the first obstacle 01 and the fourth obstacle 04, sets a direction to go straight, and rotates to travel in S10.

While traveling in parallel with the sides of the first obstacle 01 and the fourth obstacle 04, the mobile robot 1 goes straight to escape. Further, as illustrated in portion (b) of FIG. 23, in the case where the mobile robot 1 travels between the first obstacle 01 and the fourth obstacle 04 at a predetermined angle formed between the mobile robot 1 and the obstacles, before entering the space between the first obstacle 01 and the fourth obstacle 04, a length of the straight pattern of the optical pattern is long enough for the mobile robot 1 to travel, such that the mobile robot 1 continues traveling in S11. As illustrated in portion (b) of FIG. 23, if the mobile robot 1 is near the fourth obstacle 04, the mobile robot 1 changes the escape path, rotates at a predetermined angle to bypass the fourth obstacle 04, and goes straight again to escape from the stuck state in S13.

Figure 24:
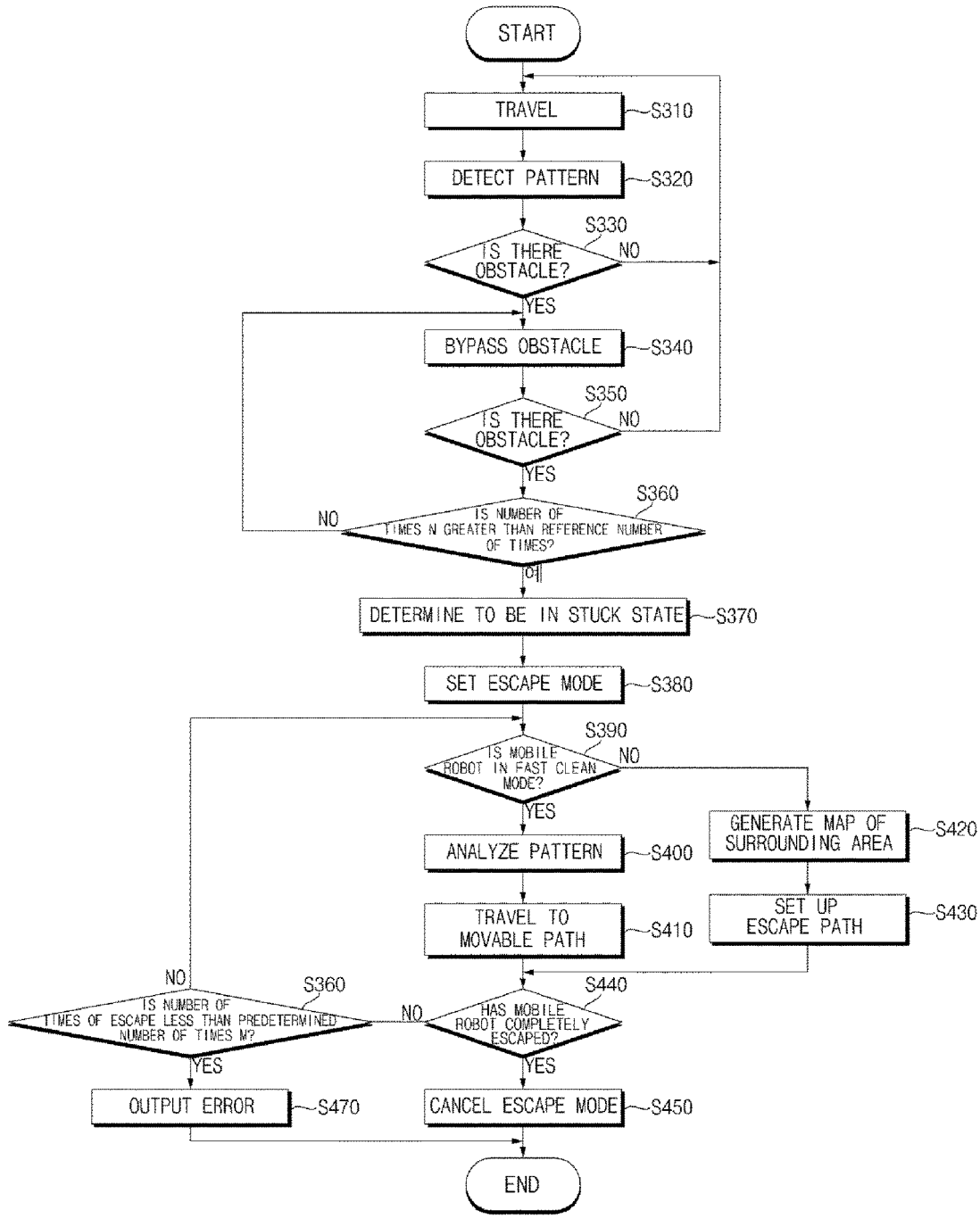
FIG. 24 is a flowchart illustrating a method of controlling a mobile robot to escape from a stuck state according to an exemplary embodiment of the present disclosure.

FIG. 24 is a flowchart illustrating a method of controlling a mobile robot to escape from a stuck state according to an exemplary embodiment of the present disclosure. As illustrated in FIG. 24, while the mobile robot 1 travels in S310, the obstacle detection unit 100 emits the first patterned light and the second patterned light, and the image acquisition unit 140 captures and acquires the emitted patterned light, and inputs the acquired image in S320.

The pattern detection unit 210 extracts an optical pattern from the acquired image, and the obstacle information obtainer 220 analyzes the extracted optical pattern to determine information on at least one of the location, shape, and size of an obstacle. If no obstacle is detected, the travel control unit 230 maintains traveling along a predetermined path. By contrast, if an obstacle is detected in S330, the obstacle information obtainer 220 inputs the obstacle information to the travel control unit 230; and the travel control unit 230 controls the travel driving unit 300 to change a traveling path to bypass the obstacle while traveling in S340.

After bypassing the obstacle while traveling, if the obstacle information obtainer 220 detects a new obstacle, the travel control unit 230 compares a number of times n of bypassing and detecting obstacles with a reference number of times; and in response to the number of times n being less than the reference number of times, the travel control unit 230 bypasses an obstacle in S340, and in response to the number of times n being greater than the reference number of times, the travel control unit 230 determines that the mobile robot 1 is in a stuck state in S370. The travel control unit 230 sets an escape mode in S380, and sets up an escape path according to a current mode of the mobile robot 1.

If the escape mode is set when the mobile robot 1 is in the fast clean mode, the travel control unit 230 analyzes the optical pattern of the acquired image in S400; and if there is a path where the mobile robot 1 may enter or travel, the travel control unit 230 controls the mobile robot 1 to travel along the path in S410. By contrast, if the mobile robot 1 is not in the fast clean mode, the travel control unit 230 generates a map of a surrounding area in S420, and sets up an escape path based on information on obstacles included in the generated map in S430.

The travel control unit 230 controls traveling according to each mode, and based on the optical pattern, determines whether mobile robot 1 has successfully escaped in S440. If the mobile robot 1 has completely escaped, the travel control unit 230 cancels the escape mode in S450. In this case, if the optical pattern is displayed in a straight line shape at the reference position, the travel control unit 230 may determine that the mobile robot 1 has successfully escaped to an area where there is no nearby obstacle.

By contrast, if the mobile robot 1 has failed to escape, for example, has encountered a new obstacle, the travel control unit 230 determines that the mobile robot 1 has not completely escaped, and counts the number of times of escape. In response to the number of times of escape being less than a predetermined number of times m in S460, the travel control unit 230 repeats an escape attempt in each mode in operations S390 to S460. In response to the number of times of escape being greater than the predetermined number of times m, the travel control unit 230 determines that it is not possible to escape, and outputs an error in S470. In this case, the travel control unit 230 may output a predetermined warning sound or effect sound to notify a user of the location of the mobile robot 1.

Figure 25:
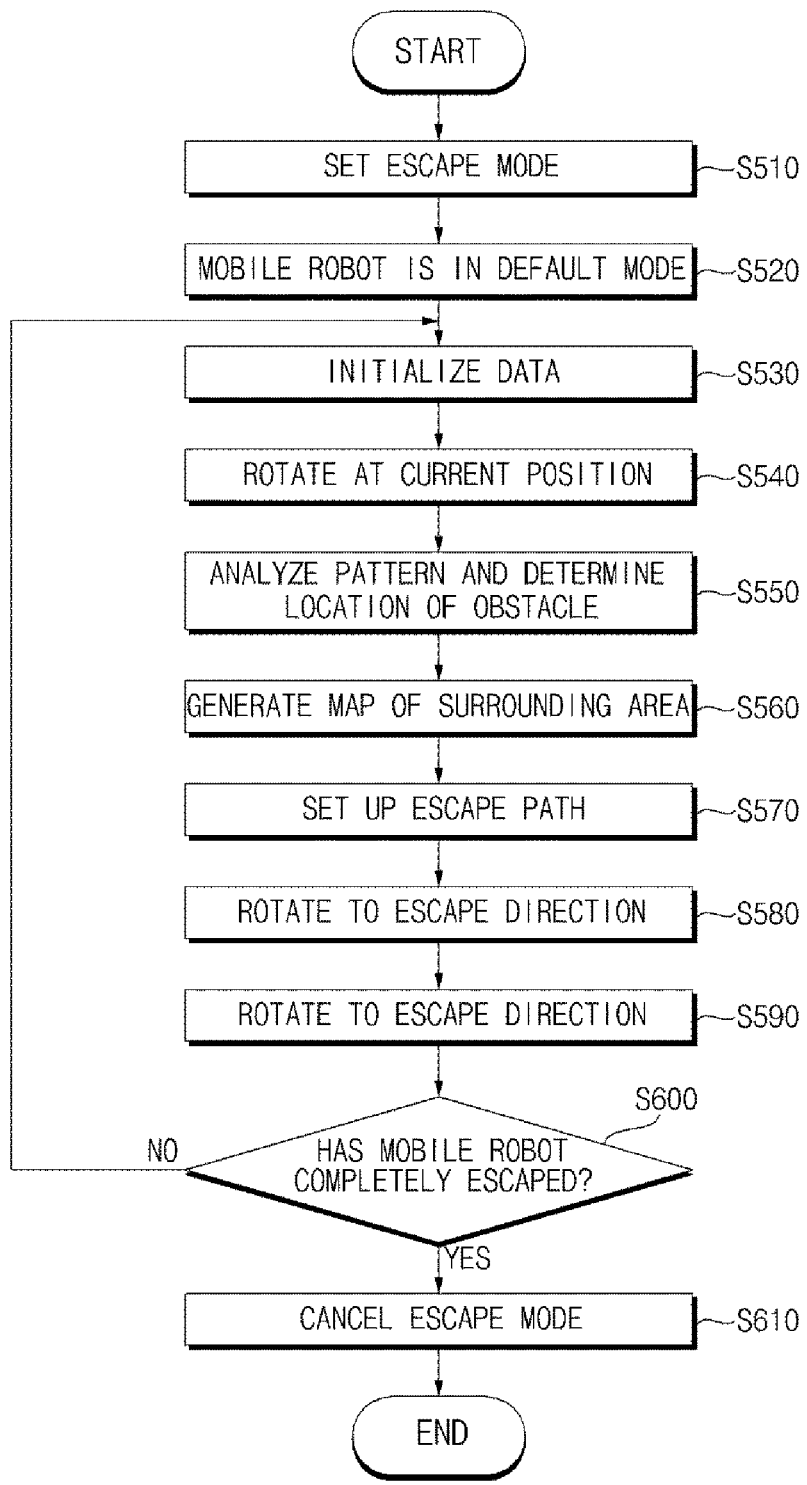
FIG. 25 is a flowchart illustrating a method of controlling a mobile robot to escape from a stuck state in a default mode.

FIG. 25 is a flowchart illustrating a method of controlling a mobile robot to escape from a stuck state in a default mode. As illustrated in FIG. 25, upon determining that the mobile robot 1 is in the stuck state, the escape mode is set in S510. In the case where the mode of the mobile robot 1 for cleaning and traveling is a default mode in S520, the travel control unit 230 initializes pre-stored information on obstacles located within a predetermined distance. In the course of determining the stuck state, there may be obstacles mistakenly detected during the obstacle detection process, and an identical obstacle may be detected several times, such that it is required to delete the pre-stored obstacle information, to detect new obstacles.

If the mobile robot 1 may rotate at the current position, the travel control unit 230 controls the travel driving unit 300 so that the mobile robot 1 may rotate once at the current position in S540. By contrast, if the mobile robot 1 may not rotate at the current position, the travel control unit 230 controls the travel driving unit 300 so that the mobile robot 1 may move forward or backward to rotate once. While the mobile robot 1 rotates once, the obstacle detection unit 100 emits patterned light, and inputs an acquired image of the patterned light to the pattern detection unit 210. The pattern detection unit 210 extracts an optical pattern from the acquired image. The obstacle information obtainer 220 analyzes the optical pattern, and based on the shape, position, and length of the optical pattern, extracts information on obstacles located within a predetermined distance from the mobile robot 1 in S550.

As described above, the obstacle information obtainer 220 compares the optical pattern with the reference position to determine the location of an obstacle, determines the shape or size of the obstacle based on the shape of the optical pattern, and based on the length of a straight line pattern (straight pattern) displayed at the reference position, determines a size (length) of a space between obstacles.

Subsequently, the obstacle information obtainer 220 generates a map of a surrounding area in S560, which includes information on obstacles located within a predetermined distance from the mobile robot 1. The generated map of the surrounding area is stored in the data unit. Based on the generated map of the surrounding area, the travel control unit 230 determines a location where the mobile robot 1 may travel, and sets up the escape path accordingly in S570.

Upon setting up the escape path, the travel control unit 230 controls the travel driving unit 300 to travel along the escape path, and the travel driving unit 300 operates such that the mobile robot 1 rotates at a predetermined angle in an escape direction in S580, and travels along the escape path in S590. The obstacle information obtainer 220 continuously analyzes the optical pattern of the acquired image to detect obstacles, and inputs obstacle information to the travel control unit 230. In the case where the optical pattern is displayed in a straight line shape at the reference position, the obstacle information obtainer 220 determines that there is no nearby obstacle, and inputs information thereon to the travel control unit 230. Based on the information input from the obstacle information obtainer 230, the travel control unit 230 determines whether the mobile robot 1 has completely escaped in S600.

In the case where a new obstacle is detected, the travel control unit 230 controls the mobile robot 1 to obtain again information on nearby obstacles, and based on the information, may set up a new path in operations S530 to S590. In the case where no obstacle is located nearby within a predetermined distance, the travel control unit 230 determines that the mobile robot 1 has completely escaped, and cancels the escape mode in S610. The travel control unit 230 controls the travel driving unit 300 so that the mobile robot 1 may perform an operation according to the predetermined traveling or cleaning mode.

Figure 26:
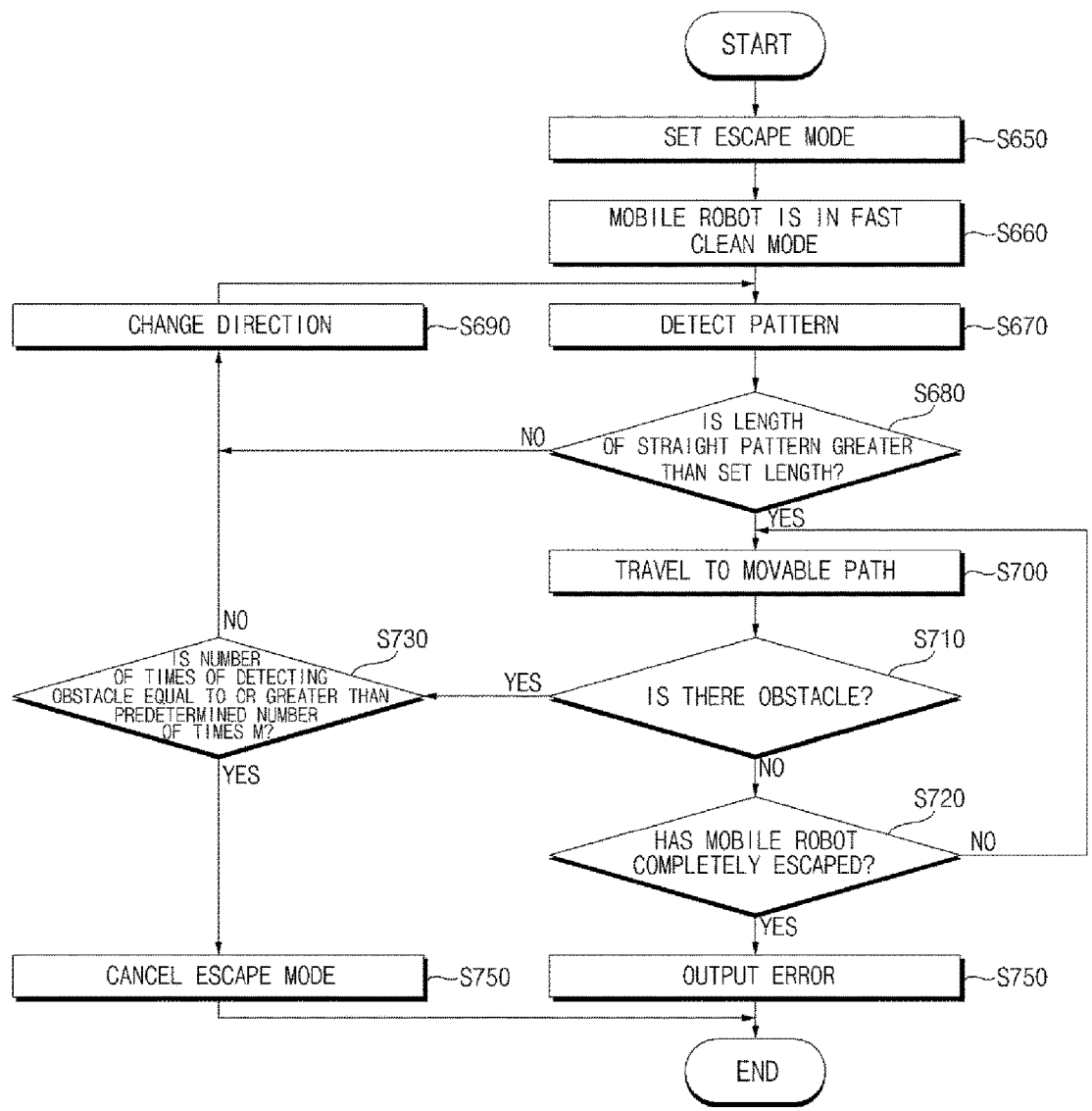
FIG. 26 is a flowchart illustrating a method of controlling a mobile robot to escape from a stuck state in a fast clean mode.

FIG. 26 is a flowchart illustrating a method of controlling a mobile robot to escape from a stuck state in a fast clean mode. As illustrated in FIG. 26, in response to determination that the mobile robot 1 is in the stuck state, the escape mode is set in S650. In the case where the mode of the mobile robot 1 for cleaning and traveling is a default mode in S660, the travel control unit 230 initializes data including information on obstacles located within a predetermined distance.

The obstacle detection unit 100 emits patterned light, and inputs an acquired image of the patterned light to the pattern detection unit 210. The pattern detection unit 210 extracts an optical pattern from the acquired image. The obstacle information obtainer 220 analyzes the optical pattern, and based on the shape, position, and length of the optical pattern, extracts information on obstacles located within a predetermined distance from the mobile robot 1 in S680.

As described above, the obstacle information obtainer 220 compares the optical pattern with the reference position to determine the location of an obstacle, determines the shape or size of the obstacle based on the shape of the optical pattern, and based on the length of a straight line pattern (straight pattern) displayed at the reference position, determines a size (length) of a space between obstacles. The travel control unit 230 compares the length of the straight pattern with a set length, to determine whether the mobile robot 1 may travel or enter in S680.

If it is determined that the mobile robot 1 may not travel or enter in response to the length of the straight pattern being less than the set length, the travel control unit 230 controls the travel driving unit 300 so that a traveling direction of the mobile robot 1 may be changed in S690. By contrast, if it is determined that the mobile robot 1 may travel or enter in response to the length of the straight pattern being greater than the set length, the travel control unit 230 may control the travel driving unit 300 so that the mobile robot 1 may travel in a passable or movable area, and the travel driving unit 300 operates such that the mobile robot 1 may travel to the area in S700.

While the mobile robot 1 travels, the obstacle detection unit 100 continuously emits patterned light and inputs an acquired image of the patterned light; and the obstacle information obtainer 220 analyzes the optical pattern to detect an obstacle. Upon detecting a new obstacle in S710, the travel control unit 230 determines whether a number of times of detecting an obstacle is equal to or greater than the predetermined number of times m in S730. In response to the number of times of detecting an obstacle being less than the predetermined number m of times, the travel control unit 230 changes the traveling direction in S690, and controls the mobile robot 1 to travel in a changed direction along a movable path.

By contrast, in response to the number of times of detecting a new obstacle being greater than the predetermined number of times m after setting up a path in the escape mode, the travel control unit 230 determines that the mobile robot 1 has failed to escape, and outputs an error in S750. This is a case where, upon setting up a path to a movable area, the travel control unit 230 continuously detects obstacles in the traveling direction, in which the mobile robot 1 encounters the obstacles more than the predetermined number of times and thus the traveling direction (path change) is changed, such that the travel control unit 230 determines that the mobile robot 1 has failed to escape.

Further, upon setting up a path, the travel control unit 230 determines that the mobile robot 1 has not completely escaped within a predetermined distance in S720, and controls the mobile robot 1 to travel to a movable path repeatedly in S700.

After traveling a predetermined distance within a predetermined number of times, if no obstacle is detected nearby, the travel control unit 230 determines that the mobile robot 1 has successfully escaped in S720, and cancels the escape mode in S720.

The travel control unit 230 controls the travel driving unit 300 so that the mobile robot 1 may perform an operation according to the predetermined traveling or cleaning mode. Further, the travel control unit 230 may return to a charging station if charging is required.

As described above, the mobile robot 1 may detect an obstacle by using an optical pattern while traveling; and based on the optical pattern, the mobile robot 1 may detect nearby obstacles while being in a stuck state, sets up a movable or passable path as an escape path, and travels along the escape path to escape from the stuck state.

The present disclosure provides a mobile robot and a method of controlling the same, in which by determining a stuck state where traveling of the mobile robot is limited by a plurality of obstacles, and by setting up an escape path based on information of nearby obstacles, the mobile robot may escape from a stuck state.

In accordance with one aspect, there is provided a mobile robot, including: a main body configured to travel in an area to be cleaned and suck foreign materials on a floor of the area to be cleaned; a first pattern emission unit provided on a front surface of the main body and configured to emit a first patterned light downward and forward from the main body; a second pattern emission unit provided on the front surface of the main body and below the first pattern emission unit, and configured to emit a second patterned light upward and forward from the main body; an image acquisition unit provided on the front surface of the main body and configured to acquire a forward image of the main body; and a controller configured to determine an obstacle by detecting a first optical pattern, corresponding to the first patterned light, and a second optical pattern, corresponding to the second patterned light, from the image acquired from the image acquisition unit, and control the main body to pass through or bypass the obstacle, wherein in a case where a plurality of obstacles prevent the main body from traveling, the controller determines the case to be a stuck state, and upon determination, the controller sets an escape mode, detects information on nearby obstacles to set up an escape path, and controls the main body to travel along the escape path to escape from the stuck state.

In accordance with another aspect, there is provided a method of controlling a mobile robot, the method including: traveling while emitting a first patterned light and a second patterned light and acquiring a forward image of the mobile robot; sensing an obstacle by detecting a first optical pattern, corresponding to the first patterned light, and a second optical pattern, corresponding to the second patterned light, from the acquired image; in a case where a plurality of obstacles, sensed by the first optical pattern and the second optical pattern, prevent the main body from traveling, determining the case to be a stuck state, and setting an escape mode; detecting information on the plurality of obstacles to search for a movable path, and setting up an escape path; and traveling along the escape path to escape from the stuck state.

The present disclosure provides the mobile robot and the method of controlling the same, in which by using patterns which are vertically provided and emitted, more specific information on obstacles may be obtained, such that obstacles may be determined rapidly and a corresponding operation may be performed. Further, based on the information on the nearby obstacles, it may be determined whether the mobile robot is in a stuck state where traveling of the mobile robot is limited by a plurality of obstacles, and an escape path may be set for traveling, such that a traveling state of the mobile robot and obstacles may be determined rapidly and a corresponding operation may be performed, thereby enabling effective traveling to escape from the stuck state.

While the present disclosure has been described herein with reference to the accompanying drawings, this disclosure is only illustrative of preferred embodiments of the present disclosure and is not intended to limit the present disclosure. Further, it will be apparent to those skilled in the art that various modifications and variations may be made without departing from the spirit and scope of the disclosure.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile robot, comprising:
a main body configured to travel in an area to be cleaned and to provide suction to a floor of the area;
a camera provided on a front portion of the main body and configured to capture an image of a prescribed area facing the front portion of the main body;
a first light source provided on the front portion of the main body and configured to emit a first patterned light downward to a first sub-area of the prescribed area;
a second light source provided on the front portion of the main body and below the first light source, the second light source being configured to emit a second patterned light to a second sub-area of the prescribed area, the second sub-area being above the first sub-area; and
a controller configured to:
identify a first optical pattern, corresponding to the first patterned light, in the image captured by the camera,
detect an obstacle based on at least one of a shape of the first optical pattern or a position of the first optical pattern in the image,
detect a second optical pattern corresponding to the second patterned light in the image captured by the camera, wherein the controller detects the obstacle further based on at least one of a shape of the second optical pattern or position of the second optical pattern in the image, and
cause the main body to move relative to the obstacle,
wherein controller, when causing the main body to move relative to the obstacle, is further configured to:
determine that the mobile robot is stuck in a region having a plurality of obstacles, including the detected obstacle and one or more additional obstacles, when mobile robot is positioned in the region for at least a threshold duration,
detect, based on determining that mobile robot is stuck in the region, attributes of two or more of the obstacles in the region,
identify, based on the attributes of two or more of the obstacles in the region, an escape path, and
control the main body to travel along the escape path.

2. The mobile device of claim 1, wherein the controller is further configured to:
measure a height of one of the obstacles in the region based on the shape of the second optical pattern or the position of the second optical pattern in the image.

3. The mobile device of claim 1, wherein the controller, when identifying the escape path, is further configured to:
determine, based on the height of the one of the obstacles in the region, whether the main body can pass over the obstacle, and
include the one of the obstacles in the region in the escape path when the main body can pass over the obstacle.

4. The mobile robot of claim 1, wherein the controller is further configured to determine that the mobile robot is stuck in the region when the mobile robot remains in the region after changing a movement of the main body at least a predetermined number of times.

5. The mobile robot of claim 1, wherein the controller, when identifying the escape path, is further configured to:
identify two of the obstacles adjacent to the mobile body;
identify a space between the two obstacles;
determine, based on attributes of the two obstacles, whether the main body can move within the space between the two obstacles, and
including the space in the escape path when the main body can move within the space.

6. The mobile robot of claim 5, wherein the controller, when identifying the escape path, is further configured to:
identify, when the main body cannot move within the space between the two obstacles, another pair of the obstacle adjacent to the main body;
identify another space between the other pair of obstacles;
determine, based on attributes of the other pair of obstacles, whether the main body can move within the other space between the other pair of obstacles, and
include the other space in the escape path when the main body can move within the other space.

7. The mobile robot of claim 1, wherein the controller, when identifying the escape path, is further configured to:
detect attributes of the obstacles in the region,
generate a map of the region based on the attributes of the obstacles,
analyze the map to identify, as the escape path, a route through the region, wherein the main body can move within the route.

8. The mobile robot of claim 7, wherein the controller, when detecting the attributes of the obstacles in the region, is further configured to:
cause the main body to rotate at a given location,
capture, using the camera, another image during the rotation,
identify another first optical pattern, corresponding to the first patterned light, in the other image captured by the camera, and
detect the attributes of the obstacles based on at least one of a shape of the other first optical pattern or a position of the other first optical pattern in the other image.

9. The mobile robot of claim 8, wherein the attributes of the obstacles in the region include respective distances between the obstacles and the given location and locations of one or more lateral edges of the obstacles, and
wherein the controller is further configured to determine, based on the locations of the lateral edges of the obstacles, sizes of spaces between the obstacles.

10. The mobile robot of claim 1, wherein the first patterned light includes a horizontal portion, and
wherein the controller is further configured to:
determine at least one of a location, a size, or a shape of one of the obstacles based on a shape or a length of a portion of the first optical pattern that corresponds to the horizontal portion of the first patterned light.

11. The mobile robot of claim 10, wherein a reference location in the captured image is associated with a given distance from the mobile body, and
wherein the controller, when determining the at least one of the location, the size, or the shape of the one of the obstacles is further configured to:
determine the one of the obstacles is located closer than the given distance from the mobile body when the portion of the first optical pattern is located above the reference location in the image.

12. The mobile robot of claim 10, wherein the controller, when determining the at least one of the location, the size, or the shape of the one of the obstacles is further configured to:
  identify a location of a lateral edge of the obstacle based on a bend in the portion of the first optical pattern, and identify a space adjacent to the lateral edge.

13. The mobile robot of claim 10, wherein the controller is further configured to determine that an obstacle is not located within the given distance when the portion of the first optical pattern is located at the reference location in the image.

14. The mobile robot of claim 13, wherein the controller, when identifying the escape path, is further configured to:
  include, in the escape path, a space in front of the main body based on determining that the portion of the first optical pattern is located at the reference location in the image.

15. The mobile robot of claim 14, wherein the controller is further configured to:
  identify a particular length of a portion of the image associated with the space is sufficiently wide for the main body, and
  include the space in front of the main body in the escape path based on determining that a width of the portion of the first optical pattern in the image is equal to or greater than the particular length.

16. The mobile robot of claim 1, wherein the controller is further configured to:
  change the escape path when another obstacle is detected while the main body is moving through the escape path.

17. The mobile robot of claim 16, wherein the controller is further configured to:
  count a number of times that the escape path changes,
  determine that the main body has escaped the region when the main body reaches in an area without an obstacle within a predetermined distance and when the number of times that the escape path changes is less than a threshold value, and
  output an error message when the number of times that the escape path changes is equal to or greater than the threshold value before reaching the area without an obstacle.

18. The mobile robot of claim 17, wherein the controller is further configured to:
  reset the number of times that the escape path changes to zero when the mobile body travels at least a predetermined distance without another obstacle being detected.

19. The mobile robot of claim 1, wherein the controller is further configured to:
  store the escape path, and
  use the stored escape path when the mobile robot returns to the region.

* * * * *